(12) United States Patent
Lalla et al.

(10) Patent No.: US 11,774,276 B2
(45) Date of Patent: Oct. 3, 2023

(54) CORIOLIS MASS FLOW METER

(71) Applicant: Endress+Hauser Flowtec AG, Reinach (CH)

(72) Inventors: Robert Lalla, Lörrach (DE); Alfred Rieder, Landshut (DE); Martin Josef Anklin, Dornach (CH); Reinhard Huber, Bad Säckingen (DE)

(73) Assignee: Endress+Hauser Flowtec AG, Reinach (CH)

( * ) Notice: Subject to any disclaimer, the term of this patent is extended or adjusted under 35 U.S.C. 154(b) by 107 days.

(21) Appl. No.: 17/416,038

(22) PCT Filed: Nov. 21, 2019

(86) PCT No.: PCT/EP2019/082041
§ 371 (c)(1),
(2) Date: Jun. 18, 2021

(87) PCT Pub. No.: WO2020/126283
PCT Pub. Date: Jun. 25, 2020

(65) Prior Publication Data
US 2022/0065674 A1 Mar. 3, 2022

(30) Foreign Application Priority Data

Dec. 20, 2018 (DE) ..................... 10 2018 133 117.7

(51) Int. Cl.
*G01F 1/84* (2006.01)
(52) U.S. Cl.
CPC ................. *G01F 1/8459* (2013.01)
(58) Field of Classification Search
None
See application file for complete search history.

(56) References Cited

U.S. PATENT DOCUMENTS 5,831,178 A * 11/1998 Yoshimura ............ G01F 1/8418
73/861.357
2003/0010136 A1 1/2003 Drahm et al.
(Continued)

FOREIGN PATENT DOCUMENTS

| CN | 1894561 A | 1/2007 |
| CN | 1934425 A | 3/2007 |

(Continued)

*Primary Examiner* — Paul M. West
*Assistant Examiner* — Mark A Shabman
(74) *Attorney, Agent, or Firm* — Christopher R. Powers; Endress+Hauser (USA) Holding, Inc.

(57) ABSTRACT

A Coriolis mass flow meter comprises a vibration element, an exciter assembly, a sensor assembly, and an electronic transformer circuit electrically coupled to the exciter assembly and the sensor assembly. The vibration element is contacted by the flowing fluid. The exciter assembly is designed to convert electric power into mechanical power to produce mechanical vibrations of the vibration element. The transformer circuit generates an electric driver signal and feeds electric power to the exciter assembly. The vibration element mechanically vibrates with a vibration frequency specified by the electric driver signal. The sensor assembly has two electrodynamic vibration sensors designed to convert vibrational movements of the vibration element at a first or at a second measurement point into electric vibration measurement signals having an AC voltage component with a frequency and with an amplitude based on the frequency and on a magnetic flux flowing through the respective vibration sensor.

30 Claims, 5 Drawing Sheets

(56) References Cited

U.S. PATENT DOCUMENTS

| | | | |
|---|---|---|---|
| 2007/0017274 A1 | | 1/2007 | Wheeler et al. |
| 2013/0055827 A1 | | 3/2013 | Bierweiler et al. |
| 2013/0228003 A1 | * | 9/2013 | Bierweiler ............ G01F 1/8477 73/1.16 |
| 2017/0350742 A1 | * | 12/2017 | Zhu ........................ G01N 9/002 |

FOREIGN PATENT DOCUMENTS

| | | |
|---|---|---|
| CN | 104236651 B | 6/2017 |
| DE | 102004014029 A1 | 10/2005 |
| DE | 102005056164 A1 | 5/2007 |
| DE | 102011080415 A1 | 2/2013 |
| DE | 102015120087 A1 | 5/2017 |
| EP | 0644403 A1 | 9/1994 |
| EP | 0919793 A2 | 6/1999 |
| JP | 06109515 A | 4/1994 |
| WO | 2018121930 A1 | 7/2018 |

\* cited by examiner

CORIOLIS MASS FLOW METER

CROSS-REFERENCE TO RELATED APPLICATIONS

The present application is related to and claims the priority benefit of German Patent Application No. 10 2018 133 117.7, filed on Dec. 20, 2018 and International Patent Application No. PCT/EP2019/082041, filed on Nov. 21, 2019, the entire contents of which are incorporated herein by reference.

TECHNICAL FIELD

The invention relates to a Coriolis mass flow meter for measuring a mass flow of a fluid substance to be measured.

BACKGROUND

In industrial measurement technology, especially, also in connection with the regulation and monitoring of automated process-engineering processes, Coriolis mass flow meters are used for the highly accurate determination of one or more measurement variables, for example a mass flow and/or a density, of a substance to be measured, for example a liquid, a gas, or a dispersion, flowing in a process line, for example a pipe, and are often formed by means of a transformer circuit, usually formed by means of at least one microprocessor, and a measuring transducer of the vibration type, which is electrically connected to said transformer circuit and through which the substance to be measured flows during operation. Examples of such Coriolis mass flow meters, for example also in the form of density meters and/or viscosity meters, are described, inter alia, in EP-A 564 682, EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0071639, US-A 2016/0313162, US-A 2016/0187176, US-A 2017/0003156, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,883,387, 6,920,798, 7,017,424, 7,040,181, 7,077,014, 7,143,655, 7,200,503, 7,216,549, 7,296,484, 7,325,462, 7,360,451, 7,665,369, 7,792,646, 7,954,388, 8,201,460, 8,333,120, 8,695,436, WO-A 00/19175, WO-A 00/34748, WO-A 01/02812, WO-A 01/02816, WO-A 01/71291, WO-A 02/060805, WO-A 2005/050145, WO-A 2005/093381, WO-A 2007/043996, WO-A 2008/013545, WO-A 2008/059262, WO-A 2009/148451, WO-A 2010/099276, WO-A 2013/092104, WO-A 2014/151829, WO-A 2016/058745, WO-A 2017/069749, WO-A 2017/123214, WO-A 2017/137347, WO-A 2017/143579, WO-A 2018/160382, WO-A 2018/174841, WO-A 85/05677, WO-A 88/02853, WO-A 88/03642, WO-A 89/00679, WO-A 94/21999, WO-A 95/03528, WO-A 95/16897, WO-A 95/29385, WO-A 95/29386, WO-A 98/02725, WO-A 99/40 394, WO-A 2018/028932, WO-A 2018/007176, WO-A 2018/007185 or German patent application DE102018102831.8, which has not been previously published.

The measuring transducer of each of the Coriolis mass flow meters shown in said documents comprises at least one vibration element, which is typically designed as a measurement tube that is straight at least in some section and/or is curved, for example U-, V-, S-, Z- or Q-shaped, at least in some sections and has a lumen surrounded by a tube wall for conducting the substance to be measured, or, as is also shown in WO-A 2018/160382, US-A 2016/0187176 or the aforementioned patent application DE102018102831.8, can also be designed, for example, as a displacement element that is positioned inside a lumen of a tube through which the substance to be measured flows. The at least one vibration element is configured to be in contact with the substance to be measured, for example such that the substance to be measured flows through and/or around it, and to be vibrated at the same time, especially, in such a way that it carries out useful vibrations, namely mechanical vibrations around a rest position, at a useful frequency also determined by the density of the medium and consequently usable as a measure of the density. In conventional Coriolis mass flow meters, not least those with a vibration element designed as a measurement tube, bending vibrations at a natural resonant frequency are typically used as useful vibrations, for example bending vibrations that correspond to a natural bending vibration fundamental mode that is intrinsic to the measuring transducer and in which the vibrations of the vibration element are those resonance vibrations that have precisely one vibration loop. In addition, with a measurement tube that is curved at least in some sections as a vibration element, the useful vibrations are typically designed in such a way that said measurement tube oscillates about an imaginary vibration axis connecting an inlet-side and an outlet-side end of the measurement tube in the manner of a cantilever clamped at one end, whereas in the case of measuring transducers having a straight measurement tube as the vibration element, the useful vibrations are mostly bending vibrations in a single imaginary vibration plane.

It is also known to excite the at least one vibration element occasionally to forced, long-lasting, non-resonant vibrations, for example for the purpose of performing recurrent checks of the measuring transducer during operation of the meter, or else to allow free damped vibrations of the at least one vibration element and to evaluate said free damped vibrations, in order, for instance as described, inter alia, in the aforementioned documents EP-A 816 807, US-A 2011/0178738 or US-A 2012/0123705, to detect, as early as possible, any damage to the at least one vibration element, which can cause an undesired reduction in the measurement accuracy and/or operational reliability of the meter in question.

In the case of measuring transducers having two vibration elements each designed as a measurement tube, these are usually integrated into the respective process line via an inlet-side distributor piece extending between the measurement tubes and an inlet-side connecting flange and via an outlet-side distributor piece extending between the measurement tubes and an outlet-side connecting flange. In the case of measuring transducers having a single measurement tube as a vibration element, the latter usually communicates with the process line via a connecting tube that opens on the inlet side and via a connecting tube that opens on the outlet side. Furthermore, measuring transducers having a single measurement tube as a vibration element each comprise at least one further vibration element, which is specifically designed as a counter-oscillator, for example a tubular, box-shaped, or planar counter-oscillator, but which is not in contact with the substance to be measured and which is coupled on the inlet side to the measurement tube to form a first coupling zone and which is coupled on the outlet side to the measurement tube to form a second coupling zone and which substantially rests or oscillates counter to the measurement tube during operation. The inner part of the measuring transducer formed by means of the measurement tube and counter-oscillator is usually held in a protective transducer housing solely by means of the two connecting tubes via which the measurement tube communicates with the process line during operation, especially in a manner allowing vibrations of the inner part relative to the transducer housing. In the case of the measuring transducers with a single, substantially straight measurement tube shown, for example, in U.S. Pat. Nos. 5,291,792, 5,796,010, 5,945,609, 7,077,014, US-A 2007/0119264, WO-A 01/02 816 or else WO-A 99/40 394, said measurement tube and the counter-oscillator are aligned substantially coaxial with one another, as is quite usual in conventional measuring transducers, in that the counter-oscillator is designed as a substantially straight hollow cylinder and is arranged in the measuring transducer in such a way that the measurement tube is at least partially encased by the counter-oscillator. Comparatively cost-effective steel grades, such as construction steel or machining steel, are generally used as materials for such counter-oscillators, especially also when titanium, tantalum, or zirconium are used for the measurement tube.

In order to actively excite or maintain vibrations of the at least one vibration element, not least also the aforementioned useful vibrations, vibration-type measuring transducers furthermore have at least one electromechanical, typically also electrodynamic, vibration exciter acting on the at least one vibration element during operation. The vibration exciter, which is electrically connected to the aforementioned transformer circuit by means of a pair of electric connecting lines, for example in the form of connecting wires and/or in the form of printed conductors of a flexible printed circuit board, is used especially, when actuated by an electric driver signal generated by drive electronics provided in the transformer circuit and correspondingly conditioned, specifically at least adapted to changing vibration properties of the at least one vibration element, to convert an electric excitation power fed by means of said driver signal into a driving force acting on the at least one vibration element at a point of action formed by the vibration exciter. The drive electronics are especially also configured to adjust the driver signal by means of internal regulation in such a way that it has a signal frequency corresponding to the useful frequency to be excited, occasionally also changing over time, optionally as a vibration amplitude predetermined by an excitation current, specifically an electric current of the driver signal. The driver signal can also, for example, be switched off occasionally during operation of the meter, for example for the purpose of enabling the aforementioned free damped vibrations of the at least one vibration element or, for example, as proposed in the aforementioned document WO-A 2017143579, in order to protect the drive electronics from overloading.

Vibration exciters of commercially available vibration-type measuring transducers are typically constructed in the manner of an air coil that operates according to the electrodynamic principle, specifically an air coil-magnet assembly which is formed by means of an air coil, which in the case of measuring transducers having vibration elements formed by a measurement tube and a counter-oscillator coupled thereto is usually fixed to the latter, specifically a coil that does not enclose a magnetic core but air instead, and a permanent magnet, which interacts with the at least one air coil, acts as an armature and is, for example, correspondingly fixed to the aforementioned measurement tube, and in which the particular air coil is positioned at least partially in an air gap, carrying a magnetic flux, of the permanent magnet. The permanent magnet and air coil are usually oriented in such a way that they extend substantially coaxially with one another and are also configured to be moved relative to one another or in opposite directions in such a way that, when the excitation current flows through the air coil, the permanent magnet and the air coil located in its air gap are moved back and forth substantially translationally. In addition, in conventional measuring transducers, the vibration exciter is usually designed and positioned such that it acts substantially centrally on the at least one measurement tube. As an alternative to a vibration exciter acting rather centrally and directly on the at least one vibration element, two vibration exciters fixed on the inlet side or the outlet side of the at least one vibration element rather than in the center of the at least one vibration element can, for example, also be used for the active excitation of mechanical vibrations of the at least one vibration element, as inter alia in the aforementioned document U.S. Pat. No. 6,092,429, or also exciter assemblies formed by means of a vibration exciter acting between the at least one vibration element and the transducer housing can, for example, be used, as proposed inter alia in U.S. Pat. No. 6,223,605 or U.S. Pat. No. 5,531,126.

Due to the useful vibrations of the at least one vibration element, not least also in the case in which the useful vibrations of the at least one vibration element are bending vibrations acting transversely to the flow direction on the flowing substance to measured, Coriolis forces dependent on the instantaneous mass flow are also known to be induced in the substance to be measured. These forces can in turn cause Coriolis vibrations of the vibration element that are dependent on the mass flow and superimposed on the useful vibrations, likewise with useful frequency, such that, between inlet-side and outlet-side vibrational movements of the at least one measurement tube that executes the useful vibrations and through which the medium flows at the same time, a propagation time difference or phase difference can be detected, which is also dependent on the mass flow and can therefore also be used as a measure of mass flow measurement. With a measurement tube that is curved at least in some sections as the vibration element, with which a vibration shape in which said measurement tube is allowed to swing in the manner of a cantilever clamped at one end is selected for the useful vibrations, the resulting Coriolis vibrations correspond, for example, to the bending vibration mode, also sometimes referred to as twist mode, in which the measurement tube executes rotary vibrations about an imaginary rotary vibration axis oriented perpendicularly to the mentioned imaginary vibration axis, whereas with a straight measurement tube as the vibration element, the useful vibrations of which are designed as bending vibrations in a single imaginary vibration plane, the Coriolis vibrations are, for example, bending vibrations substantially coplanar with the useful vibrations.

In order to detect both inlet-side and outlet-side vibrational movements of the at least one vibration element, not least also those corresponding to the useful vibrations, and to generate at least two electric vibration measurement signals influenced by the mass flow to be measured, measuring transducers of the type in question also have two or more vibration sensors that are spaced apart from one another along the at least one vibration element and for example are each electrically connected by means of a separate pair of electric connecting lines to a in the aforementioned transformer circuit. Each of the vibration sensors is configured to detect the aforementioned vibrational movements at a respective measurement point and to convert them in each case into an electric vibration measurement signal that represents said vibrational movements and contains a useful component, specifically a (spectral) signal component or specifically an AC voltage component at a (signal) frequency corresponding to the useful frequency and at a (signal) amplitude that is dependent on the useful frequency and on a magnetic flux established in the respective vibration sensor, and to provide said vibration measurement signal in each case to the transformer circuit, for example specifically to a measurement and control electronics, formed by means of at least one microprocessor, of the transformer circuit for further, possibly also digital processing. In addition, the at least two vibration sensors are designed and arranged in such a way that the aforementioned useful component of the vibration measurement signals generated therewith additionally each have a phase angle dependent on the mass flow, such that a propagation time difference or phase difference dependent on the mass flow can be measured between the useful components of both vibration measurement signals. On the basis of said phase difference, the transformer circuit or its measurement and control electronics recurrently ascertains mass flow measurement values representing the mass flow. In addition to measuring the mass flow, the density and/or the viscosity of the medium can also be measured, for example based on the useful frequency and/or on an electric excitation power required for the excitation or maintenance of the useful vibrations or on damping of the useful vibrations ascertained on the basis thereof, and output by the transformer circuit together with the measured mass flow in the form of qualified measurement values. Typically, the two vibration sensors are designed as electrodynamic vibration sensors, especially specifically formed in the same manner as the at least one vibration exciter by means of an air coil-magnet assembly, in this case acting as a plunger coil, in which one air coil is likewise respectively positioned ("immersed") at least partially in an air gap, carrying a magnetic flux, of an associated permanent magnet and in which in addition the air coil and the permanent magnet are configured to be moved relative to one another for the purpose of generating an induction voltage, such that the air coil is moved back and forth substantially translationally in the air gap. The permanent magnet and the air coil are usually aligned in such a way that they extend substantially coaxially with one another.

It is known that, when electrodynamic vibration sensors are used, the aforementioned phase angles of the useful components of each of the vibration measurement signals can change over time despite a constant mass flow or that the phase difference established between the useful components can occasionally have an interference component that is not dependent on the mass flow, such that a significant phase error, specifically an additional change that is no longer negligible in the phase difference, can be observed. Further investigations on conventional Coriolis mass flow meters have shown that such phase errors can occur especially if the Coriolis mass flow meter in question is positioned in the vicinity of one or more electric motors, transformers, magnets, inverters, or other types of plant parts carrying high electric currents, especially also direct currents, and therefore is also exposed to an occasionally very strong external additional magnetic field, specifically caused outside the Coriolis mass flow meter but also propagating within the Coriolis mass flow meter.

As is also discussed, inter alia, in the aforementioned documents WO-A 01/02812 or U.S. Pat. No. 7,665,369, one possibility for reducing the aforementioned phase error attributable to external magnetic fields consists of, for example, designing the transducer housing using materials having a comparatively high relative magnetic conductivity, for example machining steel or construction steel, such that its effective magnetic resistance is significantly reduced. Another possibility for avoiding measurement errors caused by external magnetic fields would also be, as also proposed in U.S. Pat. No. 7,665,369, to provide, in the respective magnet cups of the vibration sensors, slots suppressing eddy currents caused by external magnetic fields. Investigations have shown, however, that although the aforementioned measures weaken the magnetic fields penetrating into the transducer housing and thereby also contribute to reducing the aforementioned interference component, the phase error cannot always be reduced below a still tolerable level with a reasonable technical complexity, even by combining the two measures. As a result, it cannot easily be ruled out in a conventional Coriolis mass flow meter that, due to an unknown external, possibly also only temporarily established and/or fluctuating, magnetic field, the mass flow is measured with significantly increased, undetected measurement errors or corresponding mass flow measurement values with significantly reduced measurement accuracy are output.

SUMMARY

Proceeding from the aforementioned prior art, an object of the invention consists of improving Coriolis mass flow meters in such a way that the presence of an external magnetic field or its influence on the measurement accuracy can also be at least detected therewith, for example also correspondingly reported in a timely manner.

In order to achieve the object, the invention consists of a Coriolis mass flow meter, for example specifically a Coriolis mass flow/density meter, for measuring a mass flow of a fluid substance to be measured, for example a gas, a liquid, or a dispersion, said Coriolis mass flow meter comprising: a measuring transducer that has at least one vibration element, an exciter assembly, and a sensor assembly and which is configured to conduct the substance to be measured, specifically such that the substance to be measured flows through it at least intermittently; and an electronic transformer circuit, which is electrically coupled to the measuring transducer, specifically both to the exciter assembly thereof and to the sensor assembly thereof, and for example is formed by means of at least one microprocessor. The at least one vibration element is configured to be contacted by the flowing substance to be measured and to be vibrated at the same time, and the exciter assembly is configured to convert electric power fed to the exciter assembly into mechanical power that produces forced mechanical vibrations of the vibration element. The transformer circuit is in turn configured to generate an electric driver signal and feed electric power to the exciter assembly using the driver signal such that the vibration element at least proportionally performs useful vibrations, specifically forced mechanical vibrations at at least one useful frequency, specifically a vibration frequency specified by the electric driver signal and, for example, corresponding to a resonant frequency of the measuring transducer, said vibrations being suitable for producing, in the flowing substance to be measured, Coriolis forces based on the mass flow. In order to detect mechanical vibrations of the at least one vibration element, for example specifically its useful vibrations, the sensor assembly has an electrodynamic first vibration sensor and at least one electrodynamic second vibration sensor that is for example structurally identical to the first vibration sensor. The first vibration sensor is configured to convert vibrational movements of the at least one vibration element at a first measurement point into an electric first vibration measurement signal of the sensor assembly such that said first vibration measurement signal has at least one first useful component, specifically an AC voltage component with a frequency corresponding to the useful frequency, and with an amplitude dependent on the useful frequency and a first magnetic flux, specifically a magnetic flux through the first vibration sensor, and the second vibration sensor is configured to convert vibrational movements of the at least one vibration element at a second measurement point remote from the first measurement point into an electric second vibration measurement signal of the sensor assembly such that said second vibration measurement signal has at least one second useful component, specifically an AC voltage component having a frequency corresponding to the useful frequency, and having an amplitude dependent on the useful frequency and a second magnetic flux, specifically a magnetic flux through the second vibration sensor. In addition, the transformer circuit is also configured to receive and evaluate the first and second vibration measurement signals, specifically to ascertain, for example, digital mass flow measurement values representing the mass flow using both the first and second vibration measurement signals, and also to calculate characteristic number values for at least one first sensor characteristic number characterizing, for example, a functionality of the sensor assembly, and/or a change in the sensor assembly over time, and/or a deviation of the sensor assembly from a reference state, such that said sensor characteristic number represents a change rate, for example an average or instantaneous change rate, at which at least one of the amplitudes of the first and second useful components, for example specifically a difference between the amplitudes of the first and second useful components, changes over time, for example is specifically dependent on the change rate and/or quantifies the change rate.

According to a first embodiment of the invention, it is furthermore provided for the sensor characteristic number to represent, for example with regard to a particular magnitude, a greater of two change rates, for example average or instantaneous change rates, at which the amplitudes of the first and second useful components change over time.

According to a second embodiment of the invention, it is furthermore provided for the sensor characteristic number to represent a change rate, for example an average or instantaneous change rate, at which a difference, for example specifically a subtractive difference, between the amplitude of the first useful component and the amplitude of the second useful component changes over time.

According to a third embodiment of the invention, it is furthermore provided that the sensor characteristic number represents a change rate, for example an average or instantaneous change rate, at which a subtractive difference between the amplitudes of the first and second useful components that is normalized to one of the amplitudes of the first and second useful components, or is normalized to a sum of the amplitudes of the first and second useful components, or is normalized to an average value of the amplitudes of the first and second useful components, changes over time.

According to a fourth embodiment of the invention, it is furthermore provided that the transformer circuit is configured to compare one or more characteristic number values for the sensor characteristic number in each case with one or more reference values ascertained for the sensor characteristic number, for example by the manufacturer of the Coriolis mass flow meter and/or during manufacture of the Coriolis mass flow meter, e.g. one or more reference values representing a reduced functionality of the sensor assembly, and/or one or more reference values representing a malfunction of the sensor assembly, and/or one or more reference values representing a Coriolis mass flow meter which is no longer intact. In a development of this embodiment of the invention, the transformer circuit is furthermore configured to ascertain whether one or more characteristic number values for the sensor characteristic number is greater than the at least one reference value for the sensor characteristic number, for example specifically if one or more characteristic number values for the sensor characteristic number are greater than one or more reference values representing a reduced functionality of the sensor assembly and/or are greater than one or more reference values representing a malfunction of the sensor assembly and/or are greater than one or more reference values representing a Coriolis mass flow meter that is no longer intact, to output a message indicating this.

According to a fifth embodiment of the invention, it is furthermore provided that the transformer circuit is configured to generate from the first vibration measurement signal a first useful component sequence, specifically a sequence of digital amplitude values quantifying the amplitude of the first useful component, for example such that spectral components of the time-varying amplitude of the first useful component having a frequency of less than 1 Hz are contained in the first useful component sequence, and/or such that spectral components of the time-varying amplitude of the first useful component having a frequency of more than 5 Hz and less than 40 Hz are not contained in the first useful component sequence, and that the transformer circuit is configured to generate from the second vibration measurement signal a second useful component sequence, specifically a sequence of digital amplitude values quantifying the amplitude of the second useful component, for example such that spectral components of the time-varying amplitude of the second useful component having a frequency of less than 1 Hz are contained in the second useful component sequence, and/or such that spectral components of the time-varying amplitude of the second useful component having a frequency of more than 5 Hz and less than 40 Hz are not contained in the second useful component sequence. In a development of this embodiment of the invention, the transformer circuit is furthermore configured to calculate characteristic number values for the sensor characteristic number using the first and second useful component sequences.

According to a sixth embodiment of the invention, it is furthermore provided that the transformer circuit is configured to use the e.g. digitized first vibration measurement signal to ascertain characteristic number values for at least one first useful component characteristic number, specifically a characteristic number characterizing the first useful component and/or dependent on the amplitude of the first useful component, for example specifically a peak value of the first useful component, and/or an effective value of the first useful component, and/or a rectified value of the first useful component, and/or a vibration width of the first useful component, for example specifically to calculate characteristic number values for the at least one sensor characteristic number using characteristic number values ascertained for the first useful component characteristic number.

According to a seventh embodiment of the invention, it is furthermore provided that the transformer circuit is configured to use the e.g. digitized second vibration measurement signal, to ascertain characteristic number values for at least one second useful component characteristic number, specifically a characteristic number characterizing the second useful component and/or dependent on the amplitude of the second useful component, for example specifically a peak-to-peak value of the second useful component, and/or an effective value of the second useful component, and/or a rectified value of the second useful component, and/or a vibration width of the second useful component, for example specifically to calculate characteristic number values for the at least one sensor characteristic number using characteristic number values ascertained for the second useful component characteristic number.

According to an eighth embodiment of the invention, it is furthermore provided for the transformer circuit to have a non-volatile electronic data memory that is configured to store digital data, e.g., even without an applied operating voltage, for example specifically to store one or more previously ascertained reference values for the sensor characteristic number. In a development of this embodiment of the invention, the transformer circuit is furthermore configured to store one or more characteristic number values for the first useful component characteristic number in the data memory, e.g., together with a number value for a time variable corresponding to a time of ascertaining the particular characteristic number value, and/or to store one or more characteristic number values for the second useful component characteristic number in the data memory, e.g., together with a number value for a time variable corresponding to a time of ascertaining the particular characteristic number value. Alternatively or in addition, it is furthermore provided that one or more reference values for the sensor characteristic number, which were, for example, ascertained in advance by the manufacturer of the Coriolis mass flow meter, and/or during production of the Coriolis mass flow meter, and/or during operation of the Coriolis mass flow meter, for example specifically one or more reference values representing a reduced functionality of the sensor assembly, and/or specifically one or more reference values representing a malfunction of the sensor assembly, are stored in the electronic data memory, and/or the transformer circuit is configured to compare one or more characteristic number values for the sensor characteristic number in each case with one or more reference values, stored in the data memory, for the first sensor characteristic number.

According to a ninth embodiment of the invention, it is furthermore provided for the transformer circuit to be configured to receive and evaluate a start command that initiates at least the determination of the characteristic number values for the first sensor characteristic number, specifically to detect an input of the start command and then to initiate a determination of the characteristic number values for the first sensor characteristic number.

According to a tenth embodiment of the invention, it is furthermore provided for the transformer circuit to be configured to receive and evaluate a stop command that at least temporarily prevents the determination of the characteristic number values for the first sensor characteristic number, specifically to detect an input of the stop command and then at least temporarily stop a determination of the characteristic number values for the first sensor characteristic number.

According to an eleventh embodiment of the invention, it is furthermore provided for the sensor assembly to have at least one temperature sensor for detecting a temperature of the measuring transducer at a temperature measurement point, said temperature sensor being configured to provide a temperature measurement signal, specifically a measurement signal representing the temperature at the temperature measurement point, e.g., with an electric voltage dependent on the temperature and/or an electric current dependent on the temperature. In a development of this embodiment of the invention, the transformer circuit is furthermore configured to also receive and evaluate the temperature measurement signal, specifically to also calculate the characteristic number values for the at least one sensor characteristic number using the temperature measurement signal.

According to a twelfth embodiment of the invention, it is furthermore provided that the transformer circuit is configured to calculate, using the first and second vibration measurement signals, characteristic number values for at least one second sensor characteristic number characterizing, for example, a functionality of the sensor assembly, and/or a change in the sensor assembly over time, and/or a deviation of the sensor assembly from a reference state, such that said second sensor characteristic number represents a difference between the amplitude of the first and second useful components, for example specifically is dependent on the difference and/or quantifies the difference. In a development of this embodiment of the invention, it is furthermore provided that the second sensor characteristic number represents a subtractive difference between the amplitudes of the first and second useful components normalized, for example, to one of the amplitudes of the first and second useful components, or normalized to a sum of the amplitudes of the first and second useful components, or normalized to an average value of the amplitudes of the first and second useful components.

According to a thirteenth embodiment of the invention, it is provided that the transformer circuit has a non-volatile electronic data memory which is configured to provide digital data, e.g., even without an applied operating voltage, for example specifically to store one or more previously ascertained reference values for the sensor characteristic number, and that the transformer circuit is configured to calculate, using the first and second vibration measurement signals, characteristic number values for at least one second sensor characteristic number which characterizes, for example, a functionality of the sensor assembly, and/or a change over time in the sensor assembly, and/or a deviation of the sensor assembly from a reference state, such that said second sensor characteristic number represents a difference between the amplitude of the first and second useful components, for example is specifically dependent on the difference and/or quantifies the difference. A development of this embodiment of the invention furthermore provides that one or more reference values for the second sensor characteristic number which were, for example, ascertained in advance by the manufacturer of the Coriolis mass flow meter, and/or during production of the Coriolis mass flow meter, and/or during operation of the Coriolis mass flow meter, for example specifically one or more reference values representing a reduced functionality of the sensor assembly, and/or specifically one or more reference values representing a malfunction of the sensor assembly, are stored in the electronic data memory. In addition, the transformer circuit can be configured to compare one or more characteristic number values for the second sensor characteristic number in each case with one or more reference values stored in the data memory for the second sensor characteristic number.

According to a fourteenth embodiment of the invention, it is provided that the sensor assembly has at least one temperature sensor for detecting a temperature of the measuring transducer at a temperature measurement point, said temperature sensor being configured to provide a temperature measurement signal, specifically a measurement signal representing the temperature at the temperature measurement point, e.g., with an electric voltage dependent on the temperature and/or an electric current dependent on the temperature, and that the transformer circuit is configured to calculate, using the first and second vibration measurement signals, characteristic number values for at least one second sensor characteristic number characterizing, for example, a functionality of the sensor assembly, and/or a change over time in the sensor assembly, and/or a deviation of the sensor assembly from a reference state, such that said second sensor characteristic number represents a difference between the amplitude of the first and second useful components, for example specifically is dependent on the difference and/or quantifies the difference. In a development of this embodiment of the invention, it is furthermore provided that the transformer circuit is configured to also calculate the characteristic number values for the second sensor characteristic number and/or reference values for the second sensor characteristic number using the temperature measurement signal.

According to a fifteenth embodiment of the invention, it is furthermore provided that the measurement and control electronics has a first analog-to-digital converter for the first vibration measurement signal and a second analog-to-digital converter for the second vibration measurement signal.

According to a sixteenth embodiment of the invention, it is furthermore provided that the transformer circuit is configured to ascertain the mass flow measurement values at an update rate that is not lower than, for example specifically higher than, an update rate at which the transformer circuit ascertains the characteristic number values for the sensor characteristic number.

According to a seventeenth embodiment of the invention, it is furthermore provided that each of the first and second useful components has a phase angle dependent on the mass flow. In a development of this embodiment of the invention, the transformer circuit is furthermore configured to calculate the mass flow measurement values on the basis of a phase difference between the first and second useful components, specifically a subtractive difference between the phase angle of the first useful component and the phase angle of the second useful component.

According to an eighteenth embodiment of the invention, it is furthermore provided that the first vibration sensor is formed by means of a first plunger coil and the second vibration sensor is formed by means of a second plunger coil.

According to a nineteenth embodiment of the invention, it is furthermore provided that the first vibration sensor has a first permanent magnet, e.g., mechanically connected to the at least one vibration element to form the first measurement point, and a first air coil, and that the second vibration sensor has a second permanent magnet, e.g., mechanically connected to the at least one vibration element to form the second measurement point, and a second air coil, such that the first permanent magnet forms a first air gap carrying the first magnetic flux, and the first air coil is positioned at least partially inside said first air gap, and that the first permanent magnet and the first air coil are configured to be moved relative to one another by vibrational movements of the at least one vibration element and to generate a first induction voltage used as a first vibration measurement signal, and such that the second permanent magnet forms a second air gap carrying the second magnetic flux, and the second air coil is positioned at least partially inside said second air gap, and that the second permanent magnet and the second air coil are configured to be moved relative to one another by vibrational movements of the at least one vibration element and to generate a second induction voltage used as a second vibration measurement signal.

According to a twentieth embodiment of the invention, it is furthermore provided that the exciter assembly has a vibration exciter, e.g., an electrodynamic and/or single vibration exciter, for exciting vibrations of the at least one measurement tube.

According to a twenty-first embodiment of the invention, it is furthermore provided that the at least one vibration element is formed by means of at least one tube, which is, for example, straight at least in some sections and/or arcuate at least in some sections, with one of a tube wall, e.g., a metallic tube wall, and a lumen surrounded by said tube wall and is configured such that the substance to be measured flows through it and it is vibrated at the same time.

A basic concept of the invention is to detect the occasionally occurring influence of external magnetic fields on the sensor assembly of Coriolis mass flow meters on the basis of associated changes in the amplitudes of the useful components of the vibration measurement signals provided by the sensor assembly. The invention is based on the surprising realization that an influence of an external magnetic field on the vibration sensors of a Coriolis mass flow meter or their vibration measurement signals, which is relevant for the measurement accuracy of the Coriolis mass flow meter, is naturally asymmetrical, and that, not least, such changes in the sensor asymmetry existing between the vibration sensors or their vibration measurement signals can regularly be attributed to a disturbance of the sensor assembly by an external magnetic field which exceeds a predetermined measure for a corresponding change rate and/or which occur only temporarily.

An advantage of the invention consists, inter alia, in that a detection of external magnetic fields impairing the measurement accuracy of Coriolis mass flow meters can also already be carried out on the basis of the vibration measurement signals generated anyway during operation of Coriolis mass flow meters. Accordingly, the invention can advantageously readily be retrofitted solely by a corresponding modification of the typically re-programmable transformer circuits even in the case of already installed conventional Coriolis mass flow meters.

BRIEF DESCRIPTION OF THE DRAWINGS

The invention as well as advantageous embodiments thereof are explained in more detail below based on exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore result from the figures of the drawing and/or from the claims themselves. The figures show in detail:

DETAILED DESCRIPTION

Figure 1:
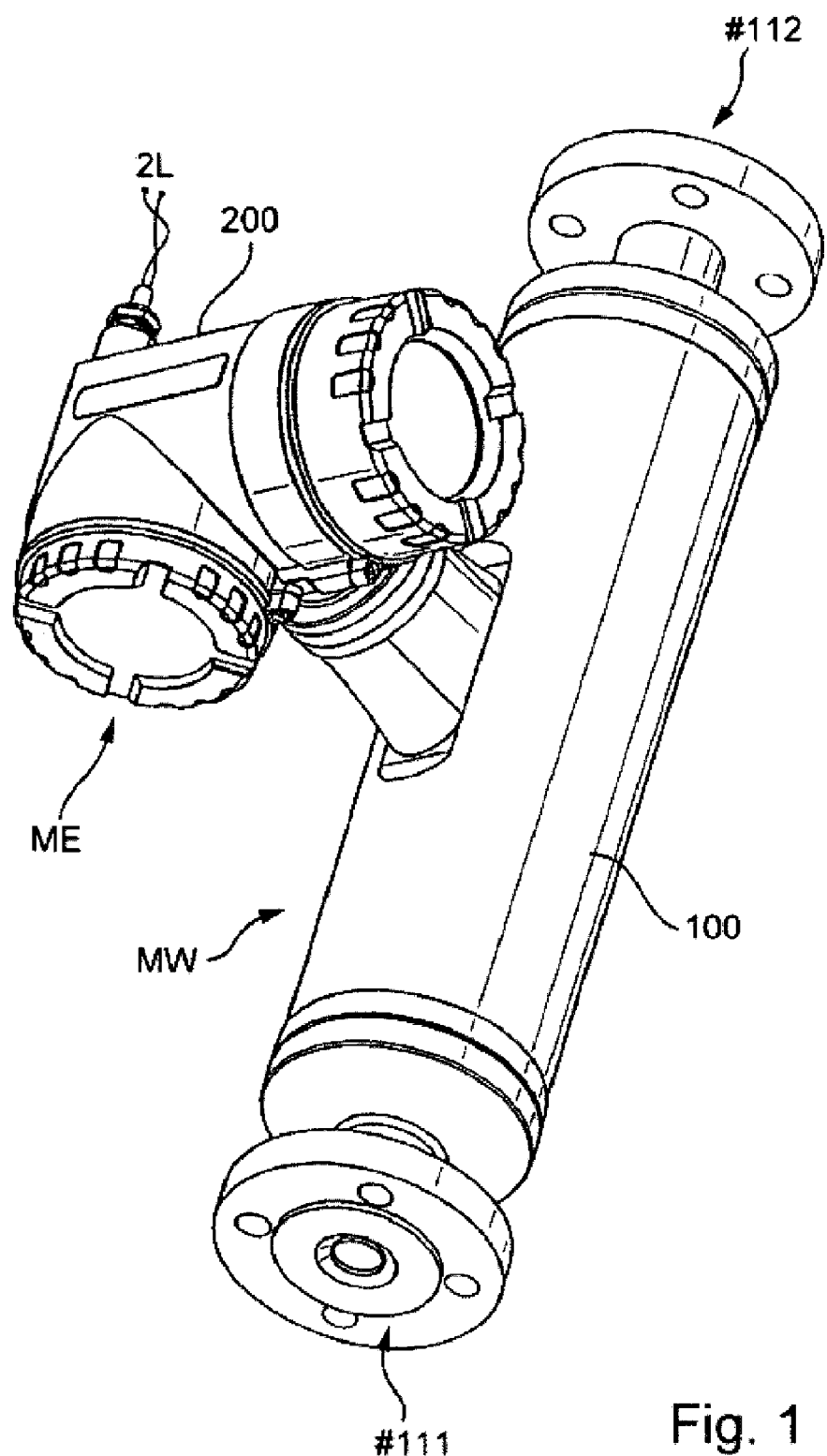
FIG. 1 shows a Coriolis mass flow meter designed here as a compact meter.
Figure 2:
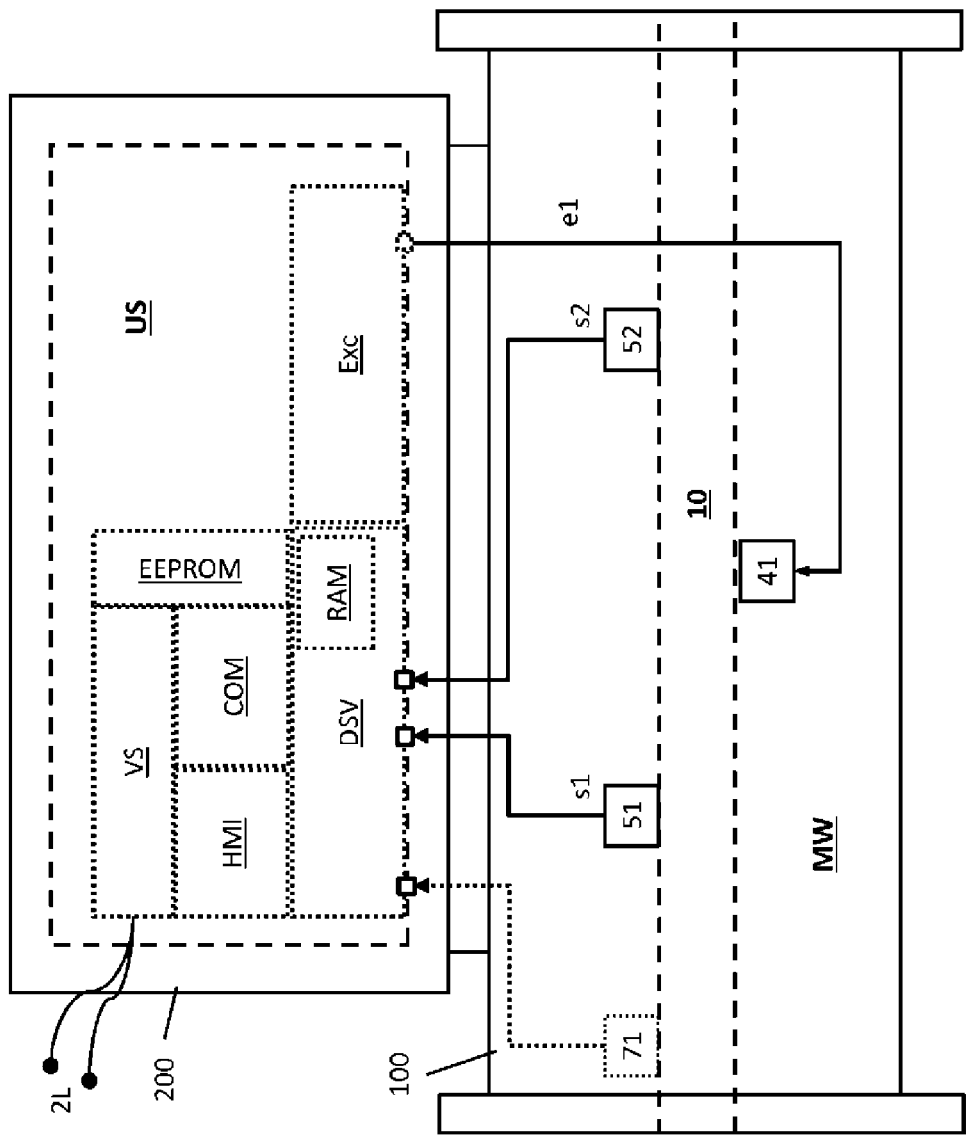
FIG. 2 schematically shows, in the manner of a block diagram, a transformer circuit, especially also suitable for a Coriolis mass flow meter according to FIG. 1, with a vibration-type measuring transducer connected thereto or a Coriolis mass flow meter according to FIG. 1.

FIGS. 1 and 2 show a Coriolis mass flow meter that can be inserted into a process line (not shown here), such as a pipe of an industrial plant, for example a filling plant or refueling device, for flowable media, especially, fluid or pourable media, for example specifically also an at least intermittently 2 or multi-phase or inhomogeneous substance to be measured. The Coriolis mass flow meter is used especially for measuring and/or monitoring a mass flow m or for ascertaining mass flow measurement values representing the mass flow of a fluid substance to be measured conducted in the aforementioned process line or at least intermittently allowed to flow therein, for example specifically a gas, a liquid, or a dispersion. Furthermore, the Coriolis mass flow meter can be used to also measure a density p and/or a viscosity q of the substance to be measured, for example specifically to ascertain and output the density measurement values representing the density and/or the viscosity measurement values representing the viscosity. According to one embodiment of the invention, it is provided to use the Coriolis mass flow meter for ascertaining mass flow measurement values of a substance to be measured that is to be transferred, for example specifically to be delivered in a predefined or predefinable amount from a supplier to a customer, for example a liquefied gas, such as a liquid gas containing methane and/or ethane and/or propane and/or butane, or a liquefied natural gas (LNG), or else a mixture of substances formed by means of liquid hydrocarbons, for example specifically a petroleum or a liquid fuel. The Coriolis mass flow meter can accordingly also be designed, for example, as a component of a transfer point for freight traffic subject to gaging obligations, such as a refueling plant, and/or as a component of a transfer point for example also in the manner of the transfer points disclosed in the mentioned documents WO-A 02/060805, WO-A 2008/013545, WO-A 2010/099276, WO-A 2014/151829, WO-A 2016/058745.

The Coriolis mass flow meter, which is also implemented, for example, as a Coriolis mass flow/density meter additionally measuring the density and/or as a Coriolis mass flow/viscosity meter additionally measuring the viscosity, comprises a physical-electric measuring transducer MW, which is connected to the process line via an inlet end #111 and an outlet end #112 and is configured such that the substance to be measured flows through it during operation, and an electronic transformer circuit US, which is electrically coupled to said measuring transducer and is especially formed by means of at least one microprocessor and/or is supplied with electric energy during operation by means of internal energy stores and/or externally via connection cables. The electric coupling or connection of the measuring transducer MW to the transformer circuit US can be effected by means of corresponding electric connecting lines and corresponding cable feedthroughs. In this case, the connecting lines can be formed at least partially as electric conductor wires sheathed at least in some sections by electric insulation, for example in the form of "twisted pair" lines, ribbon cables, and/or coaxial cables. As an alternative or in addition thereto, the connecting lines can also be formed at least in some sections by means of printed conductors of a printed circuit board, especially a flexible, optionally varnished printed circuit board.

Advantageously, the transformer circuit US, which is, for example, also programmable and/or able to be remotely parametrized, can furthermore be designed such that it can exchange measurement data and/or other operating data, for example also status messages, such as current measurement values or setting values and/or diagnostic values used to control the measurement system, with a higher-level electronic data processing system (not shown here), e.g., a programmable logic controller (PLC), a personal computer, and/or a workstation, via a data transmission system, e.g., a field bus system and/or a wireless radio connection, during the operation of the Coriolis mass flow meter. Accordingly, the transformer circuit US can have, for example, such transmitting and receiving electronics COM, which is fed during operation by a (central) evaluation and supply unit provided in the aforementioned data processing system and remote from the measurement system. For example, the transformer circuit US (or its aforementioned transmitting and receiving electronics COM) can be designed such that it can be connected electrically to the external electronic data processing system via a two-conductor connection 2L, optionally also configured as a 4-20 mA current loop, and, via said connection, can both obtain the electric power required for operating the Coriolis mass flow meter from the aforementioned evaluation and supply unit of the data processing system and transmit measurement values to the data processing system, e.g., by (load) modulating a direct supply current fed by the evaluation and supply unit. In addition, the transformer circuit US can also be designed such that it can be operated nominally at a maximum power of 1 W or less and/or is intrinsically safe. The transformer circuit US of the Coriolis mass flow meter according to the invention can also be of modular construction, for example, such that various electronic components of the transformer circuit US, such as drive electronics Exc for actuating the measuring transducer, measurement and control electronics DSV for processing measurement signals provided by the measuring transducer and for ascertaining measurement values on the basis of measurement signals from the measuring transducer, an internal power supply circuit VS for providing one or more internal operating voltages, and/or the aforementioned transmitting and receiving electronics COM used for communication with a higher-level measurement data processing system or an external field bus, respectively arranged on a separate printed circuit board and/or respectively formed by means of a dedicated microprocessor. In order to visualize measurement values generated inside the meter and/or status messages generated inside the meter, such as an error message or an alarm, on site, the Coriolis mass flow meter can furthermore have a display and operating element HMI, which also communicates at least intermittently with the transformer circuit US, for example specifically with the aforementioned measurement and control electronics DSV thereof, such as an LCD, OLED, or TFT display positioned in the aforementioned electronics housing 200, behind a window provided correspondingly therein, and a corresponding input keypad and/or a touchscreen. Furthermore, as is also readily apparent by viewing FIGS. 1 and 2 together, the transformer circuit US can also be accommodated, for example, in a corresponding separate, especially impact-resistant and/or also explosion-proof and/or hermetically sealed, electronics housing 200.

The measuring transducer MW is a vibration-type measuring transducer, specifically a measuring transducer with at least one vibration element 10, with an exciter assembly 41 and with a sensor assembly 51, 52, wherein both the exciter assembly 41 and the sensor assembly are electrically coupled to the transformer circuit US, and wherein the at least one vibration element 10 is configured to come into contact with the flowing substance to be measured, for example specifically such that the substance to be measured flows through and/or around it, and to be vibrated at the same time, for example specifically at at least one resonant frequency inherent to the vibration element or the measuring transducer formed therewith. The exciter assembly 41 of the measuring transducer MW, in turn, is configured to convert electric power fed thereto into mechanical power causing forced mechanical vibrations of the at least one vibration element 10. The measuring transducer can accordingly also be, for example, a conventional vibration-type measuring transducer, for example specifically also a measuring transducer known from the aforementioned documents EP-A 816 807, US-A 2002/0033043, US-A 2006/0096390, US-A 2007/0062309, US-A 2007/0119264, US-A 2008/0011101, US-A 2008/0047362, US-A 2008/0190195, US-A 2008/0250871, US-A 2010/0005887, US-A 2010/0011882, US-A 2010/0257943, US-A 2011/0161017, US-A 2011/0178738, US-A 2011/0219872, US-A 2011/0265580, US-A 2011/0271756, US-A 2012/0123705, US-A 2013/0042700, US-A 2016/0313162, US-A 2017/0261474, U.S. Pat. Nos. 4,491,009, 4,756,198, 4,777,833, 4,801,897, 4,876,898, 4,996,871, 5,009,109, 5,287,754, 5,291,792, 5,349,872, 5,705,754, 5,796,010, 5,796,011, 5,804,742, 5,831,178, 5,945,609, 5,965,824, 6,006,609, 6,092,429, 6,223,605, 6,311,136, 6,477,901, 6,505,518, 6,513,393, 6,651,513, 6,666,098, 6,711,958, 6,840,109, 6,920,798, 7,017,424, 7,040,181, 7,077,014, 7,200,503, 7,216,549, 7,296,484, 7,325,462, 7,360,451, 7,792,646, 7,954,388, 8,333,120, 8,695,436, WO-A 00/19175, WO-A 00/34748, WO-A 01/02816, WO-A 01/71291, WO-A 02/060805, WO-A 2005/093381, WO-A 2007/043996, WO-A 2008/013545, WO-A 2008/059262, WO-A 2010/099276, WO-A 2013/092104, WO-A 2014/151829, WO-A 2016/058745, WO-A 2017/069749, WO-A 2017/123214, WO-A 2017/143579, WO-A 85/05677, WO-A 88/02853, WO-A 89/00679, WO-A 94/21999, WO-A 95/03528, WO-A 95/16897, WO-A 95/29385, WO-A 98/02725, WO-A 99/40 394, or PCT/EP2017/067826. As is customary in the case of measuring transducers of the type in question and Coriolis mass flow meters formed therewith, the vibration element 10 can be formed, for example, by means of one or more tubes, especially, tubes that are straight at least in some sections and/or arcuate at least in some sections, with one of a tube wall, especially, a metallic tube wall, and a lumen surrounded by said tube wall, wherein the tube or each of the tubes is also respectively configured to conduct the at least intermittently flowing fluid substance to be measured (and such that said substance to be measured flows through it) and to be vibrated correspondingly at the same time. However, the vibration element can also be formed, for example, by means of one or more displacement elements positioned inside a lumen of a tube of a tube of the measuring transducer through which the substance to be measured flows, the displacement element or each of the displacement elements being respectively configured such that the substance to be measured flows around them they are vibrated correspondingly at the same time. As is also indicated in FIG. 2 or can easily be seen by viewing FIGS. 1 and 2 together, the at least one vibration element 10 can also be accommodated within a transducer housing 100, together with the exciter assembly 41 and the sensor assembly as well as any other components of the measuring transducer. In addition, the aforementioned electronics housing 200 can, for example, be mounted on said transducer housing 100 to form a Coriolis mass flow meter of compact design, as also illustrated in FIGS. 1 and 2.

According to a further embodiment of the invention, the exciter assembly is formed, as is quite usual in the case of vibration-type measuring transducers, by means of at least one electromechanical vibration exciter 41, for example specifically an electrodynamic, electromagnetic, or piezoelectric vibration exciter, which can, for example, be positioned, as also shown in FIG. 2, such that a force generated therewith acts on the vibration element in the direction of an imaginary force action line running through a center of mass of the at least one vibration element, and/or which can also be, for example, the vibration exciter, effecting the only vibrations of the vibration element 10, of the exciter assembly or of the measuring transducer formed therewith, as also shown in FIG. 2.

The transformer circuit US of the Coriolis mass flow meter according to the invention is also, inter alia, provided and correspondingly configured to generate an electric driver signal e1, e.g., a bipolar and/or at least intermittently periodic, possibly also harmonic electric driver signal, and thus to feed electric power into the exciter assembly of the measuring transducer MW, such that the at least one vibration element 10 executes at least proportionally useful vibrations, specifically forced mechanical vibrations at at least one useful frequency $f_N$, which are suitable for producing Coriolis forces, which are dependent on the mass flow and act on the vibration element 10, in the flowing substance to be measured such that Coriolis vibrations, specifically mechanical vibrations additionally forced by the Coriolis forces and dependent on the mass flow m of the substance to be measured, are superimposed on the aforementioned useful vibrations at the useful frequency $f_N$. The useful frequency $f_N$ is a vibration frequency of the forced mechanical vibrations of the vibration element that is predetermined by the electric driver signal e1 and for example corresponds to the aforementioned resonant frequency $f_R$ of the measuring transducer ($f_N=f_R$). The driver signal e1 can accordingly be, for example, a harmonic electric signal that forms the aforementioned signal component $e1_N$ determining the useful frequency $f_N$ or, for example, also a multi-frequency electric signal that is composed of multiple (spectral) signal components and contains a spectral useful component $e1_N$ determining the useful frequency $f_N$. As is quite usual in Coriolis mass flow meters, the useful vibrations excited by means of the exciter assembly 41 and the transformer circuit US connected thereto can also be, for example, bending vibrations of the at least one vibration element 10 about an associated rest position, wherein, for example, an instantaneous resonant frequency, also dependent on the density and/or viscosity of the substance to be measured conducted in the measuring transducer and in contact with the vibration element 10 thereof, of a bending vibration fundamental mode, having only a single vibration loop, of the at least one vibration element 10 and/or a lowest instantaneous resonant frequency of the at least one vibration element 10 can be selected, specifically set by means of the driver signal e1, as the useful frequency $f_N$. As is quite usual in Coriolis mass flow meters, in order to generate the driver signal e1 or to set the useful frequency $f_N$, the transformer circuit US can have, for example, a corresponding drive electronics Exc, especially formed by means of one or more phase locked loops (PLL) used to ascertain and set the useful frequency $f_N$. According to a further embodiment of the invention, the drive electronics Exc has a digital frequency output. In addition, the drive electronics Exc are also configured to output at said frequency output a frequency sequence, specifically a sequence of digital frequency values that quantify the signal frequency set for the driver signal e1, for example specifically the currently set useful frequency (or the signal frequency of its signal component eN1).

Figure 3:
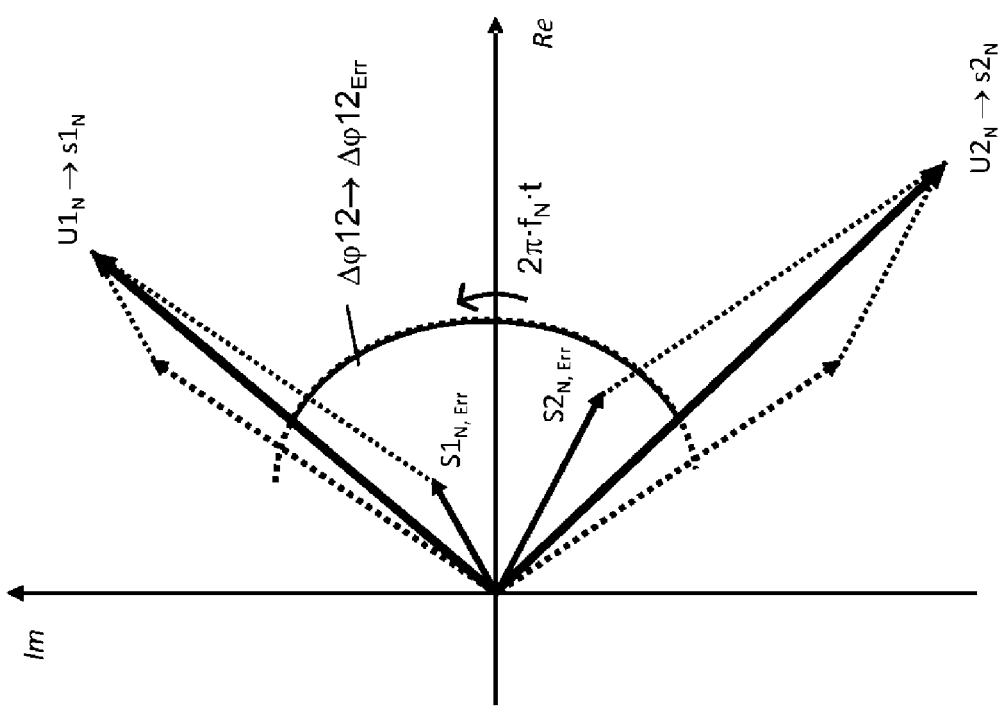
FIG. 3 shows a phasor diagram (vector diagram with static vectors) for signal components of vibration measurement signals generated by means of a Coriolis mass flow meter according to FIG. 1 or by means of a transformer circuit according to FIG. 2 connected to a vibration-type measuring transducer.

The sensor assembly of the measuring transducer is in turn configured to detect mechanical vibrations of the at least one vibration element 10, not least also forced mechanical vibrations of the at least one vibration element 10, and to provide in each case vibration measurement signals (s1, s2) representing at least proportionally vibrational movements of the at least one vibration element 10. In order to detect mechanical vibrations of the at least one vibration element, the sensor assembly of the Coriolis mass flow meter according to the invention has an electrodynamic first vibration sensor 51, for example formed by means of a first plunger coil, and at least one electrodynamic second vibration sensor 52, for example formed by means of a second plunger coil and/or structurally identical to the first vibration sensor 51. Especially, the vibration sensor 51 is configured to convert vibrational movements of the at least one vibration element 10 at a first measurement point into an electric first vibration measurement signal s1 of the sensor assembly such that, as also shown in FIG. 3, said vibration measurement signal s1 has at least one first useful component $s1_N$ (dependent on the time t), specifically an AC voltage component at a frequency corresponding to the useful frequency $f_N$, and the vibration sensor 52 is configured to convert vibrational movements of the at least one vibration element at a second measurement point, remote from the first measurement point, into an electric second vibration measurement signal s2 of the sensor assembly such that, as also indicated in FIG. 3, said vibration measurement signal s2 has at least one second useful component $s2_N$ (dependent on the time t), specifically an AC voltage component at a frequency corresponding to the useful frequency $f_N$. Given that each of the two vibration sensors 51, 52 is an electrodynamic vibration sensor, the useful component $s1_N$ accordingly has an amplitude $U1_N$ (or dependent voltage level) depending on the useful frequency $f_N$ and on a first magnetic flux $\Phi1$, specifically a magnetic flux through the vibration sensor 51, and the useful component $s2_N$ accordingly has an amplitude $U2_N$ (or dependent voltage level) depending on the useful frequency $f_N$ and on a second magnetic flux $\Phi2$, specifically a magnetic flux through the vibration sensor 52. Each of the two vibration sensors can, as is quite usual in measuring transducers of the type in question, be formed, for example, by means of a plunger coil.

Accordingly, according to a further embodiment of the invention, it is provided that the first vibration sensor has a first permanent magnet, for example specifically mechanically connected to the at least one vibration element to form the first measurement point, and a first air coil, for example mechanically connected to the at least one vibration element and/or to the aforementioned transducer housing, and that the second vibration sensor has a second permanent magnet, for example specifically mechanically connected to the at least one vibration element to form the second measurement point, and a second air coil, for example mechanically connected to the at least one vibration element and/or to the aforementioned transducer housing. The first permanent magnet forms a first air gap carrying the magnetic flux $\Phi1$, within which air gap the first air coil is at least partially positioned, and the second permanent magnet forms a second air gap carrying the magnetic flux $\Phi2$, within which air gap the second air coil is at least partially positioned. Furthermore, the first permanent magnet and the first air coil are configured to be moved relative to one another by vibrational movements of the at least one vibration element and to generate a first induction voltage ($u_{i1}$) serving as a vibration measurement signal s1, and the second permanent magnet and the second air coil are configured to be moved relative to one another by vibrational movements of the at least one vibration element and to generate a second induction voltage ($u_{i2}$) serving as a vibration measurement signal s2, wherein the aforementioned first and second induction voltages are dependent in each case in accordance with the law of induction (for motion induction):

$$u_{i1} = \frac{d\Psi1}{dt} \sim \Psi1 \cdot 2\pi \cdot f_N \cdot \cos(2\pi \cdot f_N \cdot t) \sim N1 \cdot \Phi1 \cdot 2\pi \cdot f_N \cdot \cos(2\pi \cdot f_N \cdot t) \to s1$$

or $$u_{i2} = \frac{d\Psi2}{dt} \sim \Psi2 \cdot 2\pi \cdot f_N \cdot \cos(2\pi \cdot f_N \cdot t) \sim N2 \cdot \Phi2 \cdot 2\pi \cdot f_N \cdot \cos(2\pi \cdot f_N \cdot t) \to s2$$

on a particular interlinking or induction flux ($\Psi1=N1\cdot\Phi1$ or $\Psi2=N2\cdot\Phi2$), specifically an entire magnetic flux within the particular first or second air coil, consequently on the particular magnetic flux and an associated coil number (N1 or N2).

The vibration measurement signals s1, s2 generated by the measuring transducer MW are then supplied to the transformer circuit US, for example via electric connecting lines, in order to be correspondingly processed there, for example by means of digital signal processing (DSP), for example specifically preamplified, filtered, and digitized and then evaluated accordingly.

According to a further embodiment of the invention, the vibration sensors 51, 52 are also arranged such that, in the event of an excitation of the aforementioned Coriolis vibrations of the at least one vibration element 10, each of the useful components $s1_N$, $s2_N$ of the vibration measurement signals s1 and s2 also has a phase angle that is dependent on the mass flow m of the substance to be measured flowing through the measuring transducer MW and can for example be measured relative to the driver signal e1 or the useful component $e1_N$ thereof; this is done especially in such a manner that, as also indicated in FIG. 3, a phase difference $\Delta\varphi12$ ($\Delta\varphi12=f(m)$), which is dependent on said mass flow m, exists between the useful component $s1_N$ of the vibration signal s1 and the useful component $s2_N$ of the vibration signal s2, specifically a subtractive difference between the phase angle of the first useful component $s1_N$ and the phase angle of the second useful component $s2_N$ or that the vibration measurement signals s1, s2 follow a change in the mass flow of the substance to be measured conducted in the measuring transducer with a change in said phase difference Δφ12 (Δφ12*). As is quite usual in such measuring transducers and is also indicated in FIG. 2, the vibration sensors 51, 52 can accordingly be positioned, for example, at the same distance from a center of mass of the at least one vibration element 10, for example therefore from the center of mass of the at least one tube or from the center of mass of the at least one displacement element, such that, as viewed in the flow direction, the vibration sensor 51 is arranged on the inlet side of the at least one vibration element 10 or in the vicinity thereof, and the vibration sensor 52 is arranged on the outlet side of the at least one vibration element 10 or in the vicinity thereof. In addition, the two vibration sensors 51, 52 can also be the only vibration sensors that are used to detect vibrations of the at least one vibration element 10, such that the sensor assembly does not have any other vibration sensors apart from said vibration sensors 51, 52. According to a further embodiment of the invention, it is furthermore provided that the sensor assembly has at least one temperature sensor 61 for detecting a temperature of the measuring transducer at a temperature measurement point, said temperature sensor being configured to provide a temperature measurement signal, specifically a measurement signal representing the temperature at the temperature measurement point, especially with an electric voltage dependent on the temperature and/or an electric current dependent on the temperature. Alternatively or in addition, the sensor assembly can also have, for example, at least one strain sensor that is used to detect mechanical stresses within the measuring transducer.

As already mentioned, the transformer circuit US is provided or configured to generate the driver signal e1 and additional to receive and evaluate the vibration measurement signals s1, s2, specifically to ascertain, on the basis of the vibration measurement signals a1, s2, for example specifically on the basis of the aforementioned phase difference Δφ12 between the first and second useful components, mass flow measurement values representing the mass flow, and to output said values, for example specifically also in the form of analog values and/or in the form of digital values. According to a further embodiment of the invention, the transformer circuit US is accordingly also configured to first ascertain the phase difference Δφ12 on the basis of the vibration measurement signals s1, s2. In addition, the transformer circuit US can also be configured to ascertain, from at least one of the vibration measurement signals s1, s2 present, the respective aforementioned phase angle of its respective useful component $s1_N$, $s2_N$, for example relative to the driver signal e1 or the aforementioned useful component $e1_N$ thereof, and/or to ascertain the useful frequency $f_N$ on the basis of at least one of the vibration measurement signals s1, s2, for example to also generate, during operation, at least one phase sequence, specifically a sequence of digital phase values quantifying the phase angle of one of the first and second useful components, and/or a frequency sequence, specifically a sequence of digital frequency values quantifying the useful frequency $f_N$, such that the phase sequence corresponds to a curve over time of the phase angle of the corresponding useful component or the frequency sequence corresponds to a curve over time of the useful frequency. The determination of the phase angles or the generation of the aforementioned phase sequence can be realized, for example, as is quite usual in Coriolis mass flow meters, by means of a quadrature demodulation (Q/I demodulation) of the respective vibration measurement signal carried out in the transformer circuit US using a first harmonic reference signal (Q) having the useful frequency and a second harmonic reference signal (I) phase-shifted 90° thereto. Not least for the mentioned case in which the useful vibrations caused by the driver signal e1 are resonant vibrations of the at least one vibration element 10, the useful frequency $f_N$ of the vibration measurement signals s1, s2 can be used as a measure of the density and/or the viscosity of the substance to be measured, and the density and/or the viscosity can accordingly be ascertained by means of the transformer circuit US on the basis of the aforementioned frequency sequence. Not least for the aforementioned case in which the sensor assembly has a temperature sensor 61 and/or a strain sensor, the transformer circuit US is also configured according to a further embodiment of the invention to receive and process, especially, specifically to digitize and evaluate, the temperature measurement signal generated by the temperature sensor or the strain measurement signal generated by the strain sensor; this is done, for example, in such a way that the transformer circuit US ascertains a temperature of the displacement element and/or a temperature of the substance to be measured on the basis of the at least one temperature measurement signal. According to a further embodiment of the invention, the transformer circuit US is furthermore configured to generate, on the basis of the vibration measurement signal s1, a first useful component sequence, specifically a sequence of digital amplitude values $U1_N[m]$ (m∈N–natural numbers) quantifying the amplitude $U1_N$ of the first useful component $s1_N$, and the transformer circuit is also configured to generate, on the basis of the vibration measurement signal s2, a second useful component sequence, specifically a sequence of digital amplitude values $U2_N[n]$ (n∈N) quantifying the amplitude $U2_N$ of the second useful component $s2_N$, for example specifically such that the amplitude values $U1_N[m]$ are ascertained at equidistantly successive time points $t_m=m \cdot T_{s1}$, and therefore at an update rate $f_{s1}=1/(t_{m+1}-t_m)=1/T_{s1}$ and the amplitude values $U2_N[n]$ are ascertained at equidistantly successive time points $t_n=n \cdot T_{s2}$, and therefore at an update rate $f_{s2}=1/(t_{n+1}-t_n)=1/T_{s2}$, such that the first useful component sequence at least approximately corresponds to a curve over time of the amplitude $U1_N$ of the first useful component $s1_N$ and the second useful component sequence at least approximately corresponds to a curve over time of the amplitude $U2_N$ of the second useful component $s2_N$. The aforementioned update rates $f_{s1}$, $f_{s2}$ can be selected, for example, such that they are the same ($f_{s1}=f_{s2}$) and/or that an amplitude value $U1_N[m]$ is in each case ascertained substantially chronologically to a corresponding amplitude value $U2_N[n]$ ($t_m=t_n$). The determination of the useful components $s1_N$, $s2_N$ or the generation of the aforementioned first and second useful component sequences can, for example, in turn be realized by means of the aforementioned quadrature demodulation (Q/I demodulation) of the particular vibration measurement signal s1 or s2.

For processing the vibration measurement signals s1, s2 supplied by the measuring transducer, possibly also the aforementioned temperature measurement signal and/or strain measurement signal, for example specifically also for ascertaining the mass flow measurement values and possibly also for ascertaining the density measurement values and/or the viscosity measurement values, the transformer circuit US can also have, as indicated above, a corresponding measurement and control electronics DSV, which, as shown schematically in FIG. 2, is electrically connected to the measuring transducer MW or the sensor assembly 51, 52 thereof, for example such that a first measurement signal input of the transformer circuit US for the vibration measurement signal s1 and at least one second measurement signal input of the transformer circuit US for the vibration measurement signal s2 are formed by the measurement and control electronics DSV. The measurement and control electronics DSV can advantageously be configured to digitally process the supplied vibration measurement signals s1, s2, and possibly also the temperature measurement signals and/or strain measurement signals, for example specifically by means of at least one microprocessor and/or at least one digital signal processor (DSP) and/or by means of a programmable logic module (FPGA) and/or by means of a custom-programmed logic module (ASIC). The program codes executed in one or more of the aforementioned microprocessors or digital signal processors of the transformer circuit US during operation of the Coriolis mass flow meter can each be stored persistently, for example, in one or more non-volatile data memories (EEPROM) of the transformer circuit US and, when the latter is started up, loaded into a volatile data memory (RAM) provided in the transformer circuit US or in the measurement and control electronics DSV, for example integrated in the microprocessor. For processing in the microprocessor or in the digital signal processor, the vibration measurement signals s1, s2 can of course first be converted into corresponding digital signals by means of corresponding analog-to-digital converters (A/D), for example specifically by digitizing the respective signal voltage of the vibration measurement signals s1, s2; cf. for example the aforementioned U.S. Pat. No. 6,311,136 or US-A 2011/0271756. Accordingly, according to a further embodiment of the invention, a first analog-to-digital converter for the vibration measurement signal s1 and a second analog-to-digital converter for the vibration measurement signal s2 are provided in the transformer circuit US, for example specifically in the aforementioned measurement and control electronics DSV, and/or at least one non-volatile electronic data memory EEPROM is provided in the transformer circuit US, said memory being configured to store digital data, for example specifically also without an applied operating voltage. The aforementioned phase sequence and/or the aforementioned frequency sequence can also be generated by means of the measurement and control electronics DSV, for example specifically also output at a corresponding digital phase output or at a corresponding digital frequency output and thus provided for further processing in the transformer circuit US. For the case in which the transformer circuit US is formed by means of the aforementioned drive electronics Exc and by means of the aforementioned measurement and control electronics DSV, its phase output can be electrically connected to a phase input of a phase comparator, which is provided in the drive electronics Exc and, for example, also forms a component of the aforementioned phase-locked loop (PLL), and said phase comparator can also be configured to identify a phase difference between the aforementioned signal component $e1_N$ of the driver signal e1 and at least one of the useful components $s1_N$, $s2_N$ on the basis of the phase sequence and/or to ascertain the extent of said phase difference. According to a further embodiment of the invention, the measurement and control electronics DSV is also configured to generate the aforementioned first and second useful component sequences and to output at least one of the useful component sequences at a digital amplitude output. The aforementioned amplitude output of the measurement and control electronics DSV can also be electrically connected, for example, to an amplitude input of the drive electronics Exc, which detects an amplitude of the vibrations of the at least one vibration element 10, and the drive electronics Exc can additionally be configured to generate the driver signal e1 on the basis of the amplitude sequence such that the vibrations of the at least one vibration element or its useful vibrations reach or do not permanently exceed or fall below a predetermined vibration amplitude.

Figure 4B:
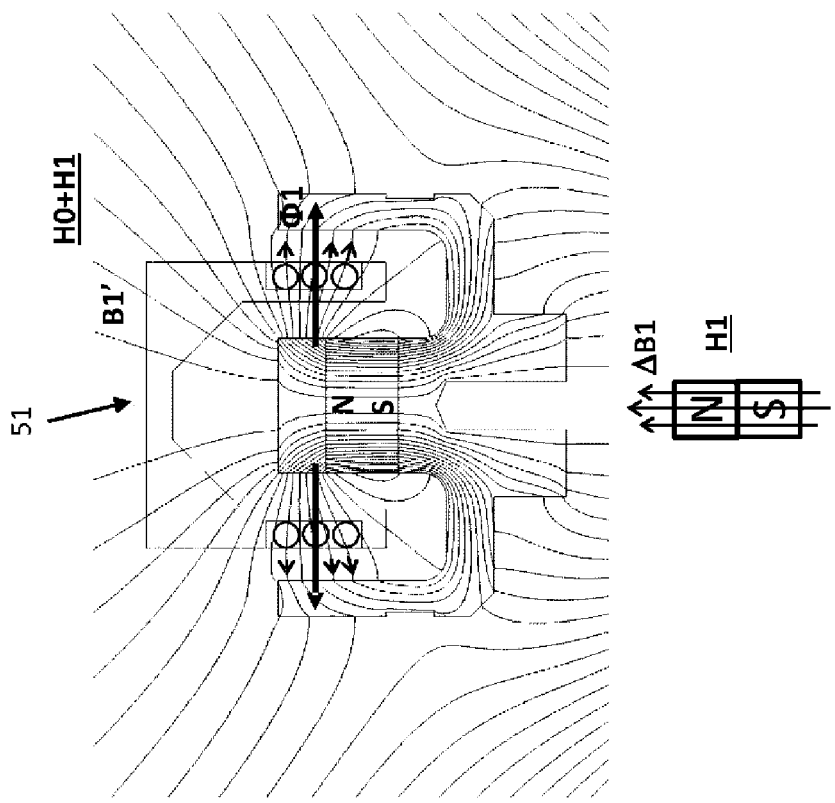
FIGS. 4a, 4b schematically show a vibration sensor in a cut-away side view as well as field lines of a magnetic field penetrating the vibration sensor.
Figure 4A:
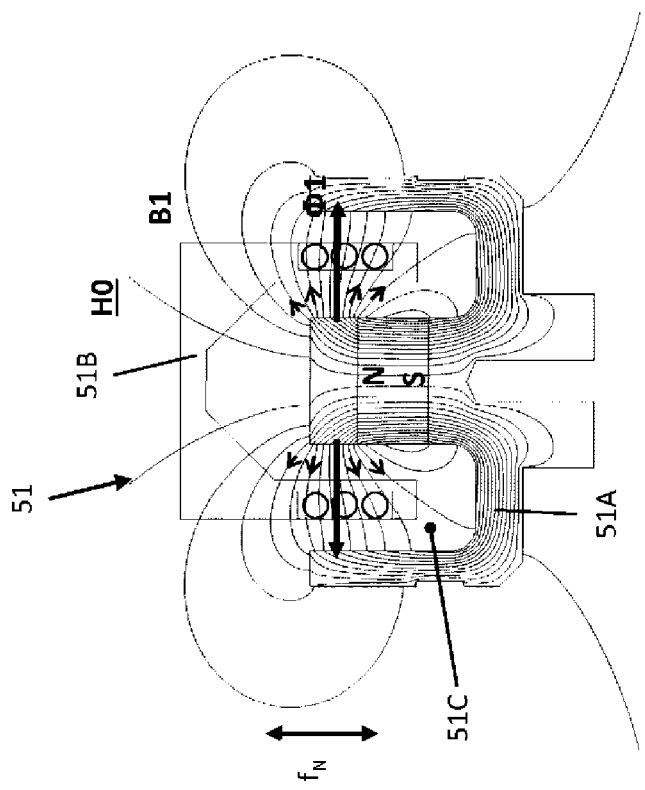
Figure 5B:
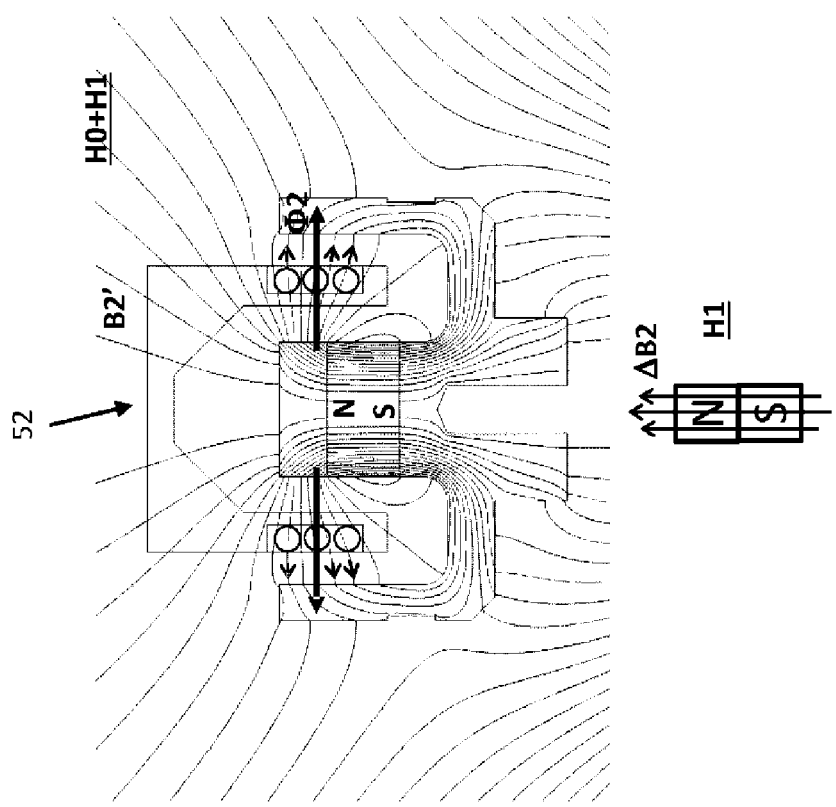
FIGS. 5a, 5b schematically show a further vibration sensor in a cut-away side view as well as field lines of a magnetic field penetrating said vibration sensor.
Figure 5A:
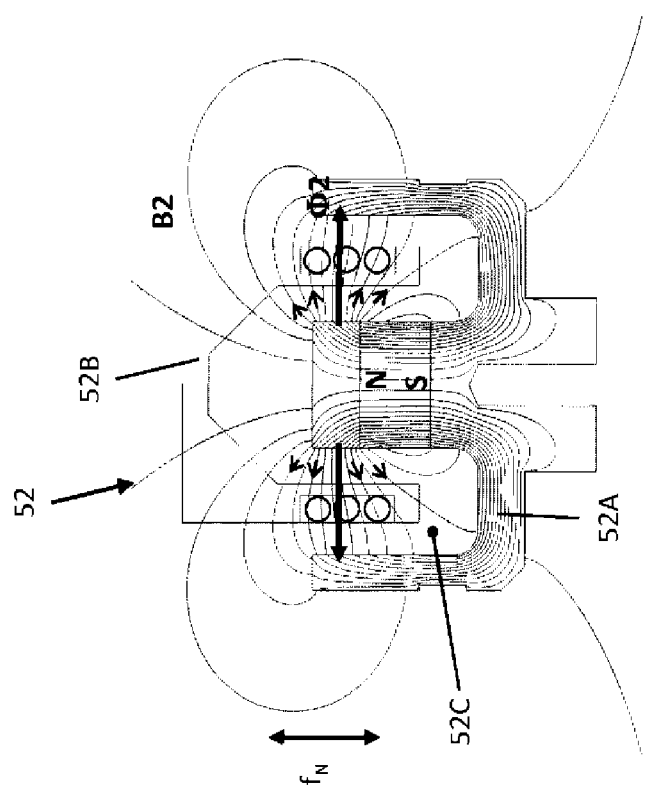

As already mentioned, the useful components of the two vibration measurement signals s1, s2 or their amplitudes, owing to the operating principle of the two electrodynamic vibration sensors, are dependent on the change over time in the magnetic flux within the vibration sensor, in the case of a plunger coil as the vibration sensor specifically the interlinking or induction flux within the particular air coil; this is especially done such that an additional influence, caused from outside the Coriolis mass flow meter during the measurement operation thereof, of a known internal magnetic field H0, specifically established within the particular vibration sensor during calibration of the measuring transducer or the thereby formed Coriolis mass flow meter, or an associated influence of a known change behavior, specifically ascertained by the aforementioned calibration, of the magnetic flux within the first and/or second vibration sensor, not least also a change behavior ($\Delta\Phi1$, $\Delta\Phi2$) of the magnetic flux $\Phi1$ or $\Phi2$ per vibration period of the useful vibrations, can, by means of an external magnetic field H1 specifically caused outside the Coriolis mass flow meter but also propagating inside the Coriolis mass flow meter, cause an undesired influence on the first and/or second useful component, which can lead, for example, specifically to increased errors in the measurement of the mass flow, and therefore impairment of the functionality of the sensor assembly. Causes of such an external magnetic field H1 may be, for example, an electric field generated in the vicinity of the particular Coriolis mass flow meter in question, e.g., owing to electric motors, transformers, inverters, or plant parts carrying high electric (direct) currents, such as bus bars, operating in the vicinity of the Coriolis mass flow meter, and/or, as also indicated in FIG. 4b or 5b, a magnet, e.g., an electromagnet or a permanent magnet, positioned in the vicinity of the Coriolis mass flow meter in question. In the case of plunger coils as vibration sensors, the aforementioned internal magnetic field H0 is in each case substantially determined by their particular permanent magnets, or the aforementioned change behavior of the magnetic flux is substantially determined by the movements of the particular permanent magnet in the associated air gap, corresponding to the vibrational movements of the at least one vibration element, and the external magnetic field H1 can result in a flux density (B1 or B2) of the particular magnetic flux $\Phi1$ or $\Phi2$ corresponding to the internal magnetic field being changed (B1→B1'=B1+$\Delta$B1, B1→B2'=B2+$\Delta$B2). Such an undesirable influence on the first and/or second useful component s1 $s2_N$ (or their amplitudes $U1_N$, $U2_N$) or impairment of the functionality of the sensor assembly by an external magnetic field can, for example, also consist in that, as also indicated in FIG. 3, at least one of the useful components contains an additional interference component ($S1_{N,\ Err}$, $S2_{N,Err}$) of equal frequency, such that the aforementioned phase angle of said useful component, and therefore also the aforementioned phase difference $\Delta\varphi12$ ($\Delta\varphi12\rightarrow\Delta\varphi12_{Err}$), then has a phase error, specifically a fraction dependent on the external magnetic field H1 and the influence thereof on the magnetic flux ultimately established in the particular vibration sensor; this, for example, also such that the integrity of at least one of the vibration measurement signals or of the mass flow measurement values is unacceptably reduced, or that said phase error drives a measurement accuracy, with which the transformer circuit US then ascertains the mass flow measurement values, out of a tolerance range specified for the Coriolis mass flow meter.

In order to enable detection as promptly as possible of an external magnetic field H1 impairing the functionality of the sensor assembly and/or of an increased measurement error attributable to the influence of such an external magnetic field H1, for example specifically lying outside a specification of the Coriolis mass flow meter, the transformer circuit of the Coriolis mass flow meter according to the invention is furthermore also configured to calculate, using the vibration measurement signals, in addition to the mass flow measurement values, at least occasionally also one or more characteristic number values for at least one (first) sensor characteristic number SK1, such that said sensor characteristic number SK1 represents a, for example average or instantaneous, change rate ($\Delta U1_N/\Delta t$; $\Delta U2_N/\Delta t$), at which at least one of the amplitudes $U1_N$, $U2_N$ of the first and second useful components $s1_N$, $s2_N$ changes over time, or represents an extent of the change of the amplitudes $U1_N$, $U2_N$ within a predetermined time interval $\Delta t$ in relation to the duration of said time interval $\Delta t$, and the following therefore applies to the sensor characteristic number SK1:

$$SK1 = f\left(\frac{\Delta U1_N}{\Delta t}\right) \text{ and/or } SK1 = f\left(\frac{\Delta U2_N}{\Delta t}\right);$$

this also, for example, in such a way that the sensor characteristic number SK1 characterizes a change over time in the sensor assembly and/or a deviation of the sensor assembly from a reference state, and/or that the sensor characteristic number SK1 quantifies the aforementioned change rate. The sensor characteristic number SK1 can be ascertained recurrently during operation of the Coriolis mass flow meter by means of the transformer circuit US, for example using digital amplitude values ascertained for the amplitudes $U1_N$, $U2_N$, or the first and second useful component sequences formed therewith in each case; alternatively or in addition, the transformer circuit can furthermore be configured to ascertain, using the vibration measurement signal s1, characteristic number values for at least one useful component characteristic number, specifically a characteristic number characterizing the first useful component $s1_N$ and/or dependent on the amplitude $U1_N$, for example specifically a peak-to-peak value of the useful component $s1_N$ ($2 \cdot U1_N$), and/or an effective value of the useful component $s1_N$ ($\sqrt{2} \cdot U1_N$), and/or a rectified value of the useful component $s1_N$ ($2/\pi \cdot U1_N$), and to calculate characteristic number values for the sensor characteristic number SK1 using characteristic number values ascertained for the first useful component characteristic number, or the transformer circuit can furthermore be configured to ascertain, using the vibration measurement signal s2, characteristic number values for at least one second useful component characteristic number, specifically a characteristic number characterizing the useful component $s2_N$ and/or dependent on the amplitude $U2_N$, for example specifically a peak-to-peak value of the useful component $s2_N$ ($2 \cdot U2_N$), and/or an effective value of the useful component $s2_N$ ($\sqrt{2} \cdot U2_N$), and/or a rectified value of the useful component $s2_N$ ($2/\pi \cdot U2_N$), and to calculate characteristic number values for the sensor characteristic number SK1 using characteristic number values ascertained for the second useful component characteristic number. In the case mentioned above in which at least one non-volatile electronic data memory EEPROM is provided in the transformer circuit US, the transformer circuit US can also be configured to store one or more of the aforementioned digital amplitude values $U1_N[m]$ or $U2_N[n]$, and/or one or more characteristic number values for the first and/or second useful component characteristic numbers in said data memory EEPROM, for example also in each case together with a number value for a time variable (time stamp) corresponding to a particular time of the determination of the particular characteristic number value.

In the aforementioned case in which the first and second useful component sequences ($U1_N[m]$, $U2_N[n]$) are generated by means of the transformer circuit US, the characteristic number values for the sensor characteristic number SK1 can, for example, also be calculated very easily using the first useful component sequence and/or the second useful component sequence, possibly also using digital amplitude values $U1_N[m]$ or $U2_N[n]$ stored in the data memory EEPROM, for example by forming, by means of the transformer circuit US or its aforementioned measurement and control electronics DSV, the change rate $\Delta U1_N/\Delta t$ of the amplitude $U1_N$ using the first useful component sequence based on the calculation rule:

$$\frac{\Delta U1_N}{\Delta t} = \frac{U1_N[m+1] - U1_N[m]}{t_{m+1} - t_m}$$

and/or the change rate $\Delta U2_N/\Delta t$ of the amplitude $U2_N$ using the second useful component sequence based on the calculation rule:

$$\frac{\Delta U2_N}{\Delta t} = \frac{U2_N[n+1] - U2_N[n]}{t_{n+1} - t_n}$$

According to a further embodiment of the invention, the transformer circuit is configured to ascertain the sensor characteristic number SK1 such that it represents a change rate $\Delta U_{12}/\Delta t$ at which a difference, occasionally also referred to as sensor asymmetry, for example specifically a subtractive difference $U_{12}$ ($U_{12}=U1_N-U2_N$) between the amplitudes $U1_N$, $U2_N$ of the first and second useful components $s1_N$, $s2_N$, or the magnitude thereof changes over time; this, for example, in such a way that the sensor characteristic number SK1 represents such a change rate $\Delta U^* A U_{12}/\Delta t$ at which a normalized subtractive difference, $\Delta U^*_{12}$, specifically the aforementioned subtractive difference $U_{12}$, normalized to one of the amplitudes $U1_N$, $U2_N$ or to an average value $0.5 \cdot (U1_N+U2_N)$ of the amplitudes $U1_N$, $U2_N$ or the magnitude thereof changes over time, and the sensor characteristic number SK1 therefore fulfills one of the conditions:

$$SK1 = \frac{\Delta U_{12}}{U1_N \cdot \Delta t} \text{ or } SK1 = \left|\frac{\Delta U_{12}}{U1_N \cdot \Delta t}\right| \text{ or } SK1 = \left|\frac{1}{M}\sum_{i=1}^{M}\frac{\Delta U_{12i}}{U1_{N,i} \cdot \Delta t}\right|,$$

$$SK1 = \frac{\Delta U_{12}}{U2_N \cdot \Delta t} \text{ or } SK1 = \left|\frac{\Delta U_{12}}{U2_N \cdot \Delta t}\right| \text{ or } SK1 = \left|\frac{1}{M}\sum_{i=1}^{M}\frac{\Delta U_{12i}}{U2_{N,i} \cdot \Delta t}\right|, \text{ or}$$

$$SK1 = 2 \cdot \frac{\Delta U_{12}}{(U1_N + U2_N) \cdot \Delta t} \text{ or } SK1 = \left|2 \cdot \frac{\Delta U_{12}}{(U1_N + U2_N) \cdot \Delta t}\right| \text{ or}$$

$$SK1 = \left|\frac{2}{M} \cdot \sum_{i=1}^{M} \frac{\Delta U_{12i}}{(U1_{N,i} + U2_{N,i}) \cdot \Delta t}\right|.$$

Alternatively or in addition, the transformer circuit US may furthermore be configured to ascertain the sensor characteristic number SK1 such that it represents the aforementioned subtractive difference $U_{12}$, normalized to a sum $U1_N$, $U2_N$ of the amplitudes $U1_N$, $U2_N$, or a corresponding amount, for example specifically fulfills a condition:

$$SK1 = \frac{\Delta U_{12}}{(U1_N + U2_N) \cdot \Delta t} \text{ or } SK1 = \left|\frac{\Delta U_{12}}{(U1_N + U2_N) \cdot \Delta t}\right| \text{ or}$$

$$SK1 = \left|\frac{1}{M} \cdot \sum_{i=1}^{M} \frac{\Delta U_{12,i}}{(U1_{N,i} + U2_{N,i}) \cdot \Delta t}\right|$$

or that it represents, for example, a greater of two, especially, average or instantaneous, change rates $\Delta U1_N/\Delta t$, $\Delta U2_N/\Delta t$ with regard to a particular magnitude, at which change rate the amplitudes $U1_N$, $U2_N$ of the first and second useful components $s1_N$, $s2_N$ change over time, and the sensor characteristic number SK1 therefore fulfills the condition:

$$SK1 = \text{Max}\left(\left|\frac{\Delta U1_N}{\Delta t}\right|, \left|\frac{\Delta U2_N}{\Delta t}\right|\right)$$

It has also been shown that not least also such external magnetic fields which occur only sporadically and/or change only very slowly or only occasionally, for example specifically as a result of switching operations within an electric power plant positioned in the vicinity of the Coriolis mass flow meter or a permanent magnet and/or electromagnet located only temporarily in the vicinity of the Coriolis mass flow meter, can impair the functionality of the sensor assembly and thus be of particular interest for detection. Along with such external magnetic fields, the aforementioned interference components contained in the useful components in each case or also the amplitudes $U1_N$ and $U2_N$ associated therewith change correspondingly slowly. In order to be able to also detect or report especially such magnetic fields or their influence on the sensor assembly as easily and error-free as possible when ascertaining the sensor characteristic number SK1, the transformer circuit US according to a further embodiment of the invention is furthermore configured to generate the aforementioned first and second useful component sequences such that such spectral components of the time-varying amplitude $U1_N$ are contained in the first useful component sequence, or such spectral components of the time-varying amplitude $U2_N$ are contained in the second useful component sequence which are in each case smaller than a predetermined frequency value, for example 1 Hz, and/or that such spectral components of the time-varying amplitude $U1_N$ are at least not contained in the first useful component sequence, or such spectral components of the time-varying amplitude $U2_N$ are at least not contained in the second useful component sequence which are each greater than a predetermined lower frequency value, for example 5 Hz, and which are each smaller than a predetermined upper frequency value, for example 40 Hz.

In order to detect the presence of an external magnetic field that impairs the functionality of the sensor assembly and therefore the measurement accuracy of the Coriolis mass flow meter, the transformer circuit US according to a further embodiment of the invention is also configured to evaluate one or more characteristic number values for the at least one sensor characteristic number SK1, for example specifically to compare them in each case with one or more reference values $BK1_1$ ($BK1_1$, $BK1_2$, ... $BK1_i$ ... ) ascertained in advance for said sensor characteristic number SK1 and, for example, specifically stored in the aforementioned non-volatile electronic data memory EEPROM. Accordingly, the transformer circuit US is also configured to ascertain whether one or more characteristic number values for the sensor characteristic number SK1 are greater than one or more such reference values for the sensor characteristic number SK1, for example specifically representing a Coriolis mass flow meter that is no longer intact, and possibly, for example, also to output a (fault) message indicating this, for example specifically to display it on site and/or to transmit it as a status message to the aforementioned electronic data processing system. The aforementioned reference values for the sensor characteristic number SK1 can be, for example, reference values representing a reduced functionality (attributable to an external magnetic field) of the sensor assembly or a malfunction (attributable to an external magnetic field) of the sensor assembly. Said reference values can be ascertained, for example, in advance, for example specifically by the manufacturer of the Coriolis mass flow meter or during (factory) calibration carried out during the production of the Coriolis mass flow meter and/or during commissioning on site and/or during operation of the Coriolis mass flow meter; this is done, for example, such that first the respective sensor characteristic number SK1 is ascertained for the finished and therefore still intact Coriolis mass flow meter and is converted into the reference value $BK1_1$ with a tolerance value corresponding to a still tolerable influence and/or by ascertaining the sensor characteristic number SK1 directly by means of the Coriolis mass flow meter which is positioned in the vicinity of a magnet that causes a reference magnetic field but is otherwise intact and storing it as a reference value $BK1_1$ in the data memory EEPROM. For the aforementioned case in which the sensor characteristic number SK1 represents the change rate $\Delta U^*_{12}/\Delta t$ (of the normalized subtractive difference $\Delta U^*_{12}$), the associated at least one reference value may, for example, be set to 10%/1 min. In addition, in order to be able to reliably detect the presence of a particularly harmful, specifically slowly changing, external magnetic field or its influence on the sensor assembly and, if necessary, also to be able to reliably report it or, conversely, to be able to exclude undesirable false alarms as far as possible, the transformer circuit US is also configured according to a further embodiment of the invention to compare the sensor characteristic number SK1 both with a lower first reference value $BK1_1$, for example specifically 10%/1 min, and with an upper second reference value $BK1_2$, different from the reference value BK1, for the sensor characteristic number SK1, for example 10%/1 s, and (only) in the case that the sensor characteristic number SK1 is greater than the reference value $BK1_1$ but less than the reference value $BK1_2$, to output the aforementioned fault message.

For the purpose of increasing the reliability of the at least one sensor characteristic number SK1 or the detection of an external magnetic field based thereon, the transformer circuit US according to a further embodiment of the invention is furthermore configured to also evaluate the aforementioned temperature measurement signal, specifically to also calculate the characteristic number values for the at least one sensor characteristic number SK1 using the temperature measurement signal, for example specifically to correspondingly take into account or compensate for the influences of the temperature of the substance to be measured or of the displacement element on the vibration measurement signals, which are also inter alia discussed in the aforementioned WO-A 2009/148451, WO-A 2018/007176, or WO-A 2018/007185. Alternatively or in addition, the transformer circuit US can also ascertain further sensor characteristic numbers based on the useful components in order to improve the detection of external magnetic fields. Hence, according to a further embodiment of the invention, the transformer circuit US is also configured to also use the vibration measurement signals s1, s1 to calculate characteristic number values for at least one second sensor characteristic number SK2, for example characterizing, analogously to the sensor characteristic number SK1, a functionality of the sensor assembly, and/or a change over time in the sensor assembly, and/or a deviation of the sensor assembly from a reference state, such that said sensor characteristic number SK2 represents a difference $U_{12}$ between the amplitude $U1_N$ and the amplitude $U2_N$ (sensor asymmetry), for example is specifically dependent on and/or quantifies said difference $U_{12}$. The aforementioned normalized subtractive difference $\Delta U^*_{12}$ can, for example, also serve as the sensor characteristic number SK2.

In addition, the transformer circuit US can furthermore be configured to compare one or more of the characteristic number values for the sensor characteristic number SK2, for example specifically the aforementioned subtractive difference $U_{12}$, in each case with at least one reference value $BK2_1$ for the sensor characteristic number SK2, for example specifically to ascertain whether one or more characteristic number values for the sensor characteristic number SK2 are greater than said reference value $BK2_1$, and at least then also to output a fault message signaling a Coriolis mass flow meter which is no longer intact, for example specifically to display it on site and/or to transmit it as a status message to the aforementioned electronic data processing system if the sensor characteristic number SK2 is also greater than the at least one associated reference value $BK2_1$. The at least one reference value $BK2_1$ can likewise be ascertained in advance, for example specifically in the same way as the at least one reference value $BK1_1$ for the sensor characteristic number SK1, by the manufacturer of the Coriolis mass flow meter or in a (factory) calibration carried out during the production of the Coriolis mass flow meter and, for example, be also stored in the aforementioned non-volatile electronic data memory EEPROM.

In order to increase the reliability of the sensor characteristic number SK2, for example specifically to accordingly take into account or compensate for the influences of the temperature of the substance to be measured or of the displacement element on the vibration measurement signals or their asymmetry, which are also inter alia discussed in the aforementioned WO-A 2009/148451, WO-A 2018/007176, or WO-A 2018/007185, the transformer circuit US according to a further embodiment of the invention is furthermore configured to also calculate the characteristic number values for the one sensor characteristic number SK2 using the temperature measurement signal.

The determination of the characteristic number values SK1 and, if applicable, also of the characteristic number values SK2, or the determination of the presence of an external magnetic field can be initiated or suspended, for example, in an automated manner, for example specifically in a time-controlled manner and/or also depending on changes in other diagnostic values. Alternatively or in addition, however, the determination of the characteristic number values can also be initiated and/or suspended from outside the Coriolis mass flow meter, for example specifically starting from the aforementioned electronic data processing system via the aforementioned transmitting and receiving electronics COM and/or from operating personnel on site via the aforementioned display and operating element HMI. Accordingly, the transformer circuit according to a further is configured to receive and evaluate a start command that initiates at least the determination of the characteristic number values for at least the sensor characteristic number SK1, possibly specifically also the aforementioned evaluation thereof, specifically to detect an input of the start command and then to start determination of the characteristic number values for the first sensor characteristic number SK1, and/or the transformer circuit is configured to receive and evaluation a stop command that at least temporarily suspends the determination of the characteristic number values for the sensor characteristic number SK1, specifically to detect an input of the stop command and then at least temporarily stop determination of the characteristic number values for the first sensor characteristic number SK1.

The invention claimed is:

1. A Coriolis mass flow meter for measuring a mass flow of a fluid substance, the Coriolis mass flow meter comprising:
   a measuring transducer, including:
      a vibration element;
      an exciter assembly; and
      a sensor assembly, wherein the measuring transducer is configured to conduct the substance to be measured therethrough; and
   an electronic transformer circuit electrically coupled to the exciter assembly and to the sensor assembly, wherein the electronic transformer circuit includes a microprocessor and a non-volatile electronic data memory configured to store digital data even without an applied operating voltage,
   wherein the vibration element is configured to be contacted by the fluid substance and to be vibrated at the same time,
   wherein the exciter assembly is configured to convert electric power fed to the exciter assembly into mechanical power causing forced mechanical vibrations of the vibration element,
   wherein the transformer circuit is configured to generate an electric driver signal and feed electric power to the exciter assembly using the driver signal, such that the vibration element executes forced mechanical vibrations at a used frequency, which is a vibration frequency specified by the electric driver signal, wherein the mechanical vibrations are suitable for producing, in the fluid substance, Coriolis forces based on the mass flow,
   wherein to detect mechanical vibrations of the vibration element, the sensor assembly includes an electrodynamic first vibration sensor and an electrodynamic second vibration sensor that is structurally identical to the first vibration sensor,
   wherein the first vibration sensor is configured to convert vibrational movements of the vibration element at a first measurement point into an electric first vibration measurement signal of the sensor assembly such that the first vibration measurement signal includes a first signal component, which is an AC voltage component at a frequency corresponding to the used frequency and at an amplitude dependent on the used frequency and a first magnetic flux through the first vibration sensor,
   wherein the second vibration sensor is configured to convert vibrational movements of the vibration element at a second measurement point remote from the first measurement point into an electric second vibration measurement signal of the sensor assembly such that the second vibration measurement signal includes a second signal component, which is an AC voltage component at a frequency corresponding to the used frequency and at an amplitude dependent on the used frequency and a second magnetic flux through the second vibration sensor, and wherein the transformer circuit is configured to receive and evaluate the first and second vibration measurement signals both to ascertain the mass flow measurement values and to calculate characteristic number values for at least one sensor characteristic number, such that said sensor characteristic number represents a change rate at which at least one of the amplitudes of the first and second signal components changes over time.

2. The Coriolis mass flow meter according to claim 1,
wherein the transformer circuit is configured to receive and evaluate a start command that initiates at least the determination of the characteristic number values at least for the first sensor characteristic number, and/or
wherein the transformer circuit is configured to receive and evaluate a stop command that at least temporarily prevents the determination of the characteristic number values for the first sensor characteristic number.

3. The Coriolis mass flow meter according to claim 1,
wherein the sensor characteristic number represents a greater of two average or instantaneous change rates with regard to a particular magnitude at which change rate the amplitudes of the first and second signal components change over time.

4. The Coriolis mass flow meter according to claim 1,
wherein the sensor characteristic number represents an average or instantaneous change rate at which a subtractive difference between the amplitude of the first signal component and the amplitude of the second signal component changes over time.

5. The Coriolis mass flow meter according to claim 1,
wherein the sensor characteristic number represents an average or instantaneous change rate at which a subtractive difference between the amplitudes of the first and second signal components that is normalized to one of the amplitudes of the first and second signal components, or is normalized to a sum of the amplitudes of the first and second signal components, or is normalized to an average value of the amplitudes of the first and second signal components, changes over time.

6. The Coriolis mass flow meter according to claim 1,
wherein the transformer circuit is configured to compare one or more characteristic number values for the sensor characteristic number with in each case one or more reference values ascertained for the sensor characteristic number by the manufacturer of the Coriolis mass flow meter and/or during the production of the Coriolis mass flow meter, including at least one of:
one or more reference values representing a reduced functionality of the sensor assembly;
one or more reference values representing a malfunction of the sensor assembly; and
one or more reference values representing the Coriolis mass flow meter is no longer intact.

7. The Coriolis mass flow meter according to claim 6,
wherein the transformer circuit is configured to ascertain whether one or more characteristic number values for the sensor characteristic number are greater than the at least one reference value for the sensor characteristic number, and if one or more characteristic number values for the sensor characteristic number are greater than one or more reference values representing a reduced functionality of the sensor assembly and/or are greater than one or more reference values representing a malfunction of the sensor assembly and/or are greater than one or more reference values representing a Coriolis mass flow meter that is no longer intact, to output a message indicating this.

8. The Coriolis mass flow meter according to claim 1,
wherein the transformer circuit is configured to generate from the first vibration measurement signal a first signal component sequence of digital amplitude values quantifying the amplitude of the first signal component such that spectral components of the time-varying amplitude of the first signal component having a frequency of less than 1 Hz are contained in the first signal component sequence, and/or that spectral components of the time-varying amplitude of the first signal component having a frequency of more than 5 Hz and less than 40 Hz are not contained in the first signal component sequence, and
wherein the transformer circuit is configured to generate from the second vibration measurement signal a second signal component sequence of digital amplitude values quantifying the amplitude of the second signal component such that spectral components of the time-varying amplitude of the second signal component having a frequency of less than 1 Hz are contained in the second signal component sequence, and/or that spectral components of the time-varying amplitude of the second signal component having a frequency of more than 5 Hz and less than 40 Hz are not contained in the second signal component sequence.

9. The Coriolis mass flow meter according to claim 8,
wherein the transformer circuit is configured to calculate characteristic number values for the sensor characteristic number using the first and second signal component sequences.

10. The Coriolis mass flow meter according to claim 1,
wherein the transformer circuit is configured to use the first vibration measurement signal to ascertain characteristic number values for at least one first signal component characteristic number, which is a characteristic number characterizing the first signal component and/or dependent on the amplitude of the first signal component, which is at least one of:
an effective value of the first signal component;
a rectified value of the first signal component, and
a vibration width of the first signal component,
as to calculate characteristic number values for the at least one sensor characteristic number using characteristic number values ascertained for the first signal component characteristic number.

11. The Coriolis mass flow meter according to claim 10,
wherein the transformer circuit is configured to use the second vibration measurement signal to ascertain characteristic number values for at least one second signal component characteristic number, which is a characteristic number characterizing the second signal component and/or dependent on the amplitude of the second signal component, which is at least one of:
a peak-to-peak value of the second signal component;
an effective value of the second signal component;
a rectified value of the second signal component, and
a vibration width of the second signal component,
as to calculate characteristic number values for the at least one sensor characteristic number using characteristic number values ascertained for the second signal component characteristic number.

12. The Coriolis mass flow meter according to claim 11, wherein the transformer circuit is configured to store one or more characteristic number values for the second signal component characteristic number in the data memory together with a number value for a time variable corresponding to a time of ascertaining the particular characteristic number value.

13. The Coriolis mass flow meter according to claim 12,
wherein one or more reference values for the sensor characteristic number, which were predefined in advance by the manufacturer of the Coriolis mass flow meter, determined during production of the Coriolis mass flow meter, and/or determined during operation of the Coriolis mass flow meter are stored in the electronic data memory,
wherein the one or more reference values represent a reduced functionality and/or a malfunction of the sensor assembly.

14. The Coriolis mass flow meter according to claim 13, wherein the transformer circuit is configured to compare one or more characteristic number values for the sensor characteristic number in each case with one or more reference values for the sensor characteristic number stored in the data memory.

15. The Coriolis mass flow meter according to claim 10, wherein the transformer circuit is configured to store one or more characteristic number values for the first signal component characteristic number in the data memory together with a number value for a time variable corresponding to a time of ascertaining the particular characteristic number value.

16. The Coriolis mass flow meter according to claim 1,
wherein the data memory is configured to store one or more previously ascertained reference values for the sensor characteristic number.

17. The Coriolis mass flow meter according to claim 1,
wherein the sensor assembly includes at least one temperature sensor configured to detect a temperature of the measuring transducer at a temperature measurement point, the temperature sensor configured to generate a temperature measurement signal representing the temperature at the temperature measurement point with an electric voltage dependent on the temperature and/or with an electric current dependent on the temperature.

18. The Coriolis mass flow meter according to claim 17, wherein the transformer circuit is further configured to receive and evaluate the temperature measurement signal, and to calculate the characteristic number values for the at least one sensor characteristic number using the temperature measurement signal.

19. The Coriolis mass flow meter according to claim 1, wherein the transformer circuit is configured to calculate, using the first and second vibration measurement signals, characteristic number values for at least one second sensor characteristic number characterizing a functionality of the sensor assembly, and/or a change over time in the sensor assembly, and/or a deviation of the sensor assembly from a reference state, such that said second sensor characteristic number represents a difference between the amplitude of the first and second signal components, wherein the sensor characteristic number is dependent on the difference and/or quantifies the difference.

20. The Coriolis mass flow meter according to claim 19,
wherein one or more reference values for the second sensor characteristic number, which predefined in advance by the manufacturer of the Coriolis mass flow meter, determined during production of the Coriolis mass flow meter, and/or determined during operation of the Coriolis mass flow meter are stored in the electronic data memory,
wherein the one or more reference values represent a reduced functionality and/or a malfunction of the sensor assembly.

21. The Coriolis mass flow meter according to claim 20, wherein the transformer circuit is configured to compare one or more characteristic number values for the second sensor characteristic number in each case with one or more reference values for the second sensor characteristic number stored in the data memory.

22. The Coriolis mass flow meter according to claim 21,
wherein the second sensor characteristic number represents a subtractive difference between the amplitudes of the first and second signal components normalized to one of the amplitudes of the first and second signal components, or normalized to a sum of the amplitudes of the first and second signal components, or normalized to an average value of the amplitudes of the first and second signal components.

23. The Coriolis mass flow meter according to claim 20,
wherein the sensor assembly includes at least one temperature sensor adapted to detect a temperature of the measuring transducer as to provide a temperature measurement signal, and
wherein the transformer circuit is configured to calculate the characteristic number values for the second sensor characteristic number using the temperature measurement signal, and/or
wherein the transformer circuit is configured to calculate reference values for the second sensor characteristic number using the temperature measurement signal.

24. The Coriolis mass flow meter according to claim 1,
wherein the measurement and control electronics includes a first analog-to-digital converter for the first vibration measurement signal and a second analog-to-digital converter for the second vibration measurement signal.

25. The Coriolis mass flow meter according to claim 1,
wherein each of the first and second signal components exhibits a phase angle dependent on the mass flow.

26. The Coriolis mass flow meter according to claim 25,
wherein the transformer circuit is configured to calculate the mass flow measurement values based on a phase difference between the first and second signal components, which is a subtractive difference between the phase angle of the first signal component and the phase angle of the second signal component.

27. The Coriolis mass flow meter according to claim 1,
wherein the first vibration sensor is configured as a first plunger coil, and the second vibration sensor is configured as a second plunger coil.

28. The Coriolis mass flow meter according to claim 27,
wherein the first vibration sensor includes a first permanent magnet, connected mechanically to the at least one vibration element to form the first measurement point, and a first air coil,
wherein the first permanent magnet forms a first air gap carrying the first magnetic flux, and the first air coil is positioned at least partially within said first air gap,
wherein the first permanent magnet and the first air coil are configured to be moved relative to one another by vibrational movements of the at least one vibration element and to generate thereby a first induction voltage used as a first vibration measurement signal, wherein the second vibration sensor includes a second permanent magnet, connected mechanically to the at least one vibration element to form the second measurement point, and a second air coil, wherein the second permanent magnet forms a second air gap carrying the second magnetic flux, and the second air coil is positioned at least partially within said second air gap, and wherein the second permanent magnet and the second air coil are configured to be moved relative to one another by vibrational movements of the at least one vibration element and to generate thereby a second induction voltage used as a second vibration measurement signal.

29. The Coriolis mass flow meter according to claim 1, wherein the exciter assembly includes a vibration exciter, an electrodynamic and/or single vibration exciter, to excite vibrations of the at least one measurement tube.

30. The Coriolis mass flow meter according to claim 1, wherein the at least one vibration element includes at least one tube that is straight at least in some sections and/or arcuate at least in some sections, the at least one tube including a metallic tube wall and a lumen surrounded by said tube wall and configured such that the substance to be measured can flow therethrough while the at least one tube is vibrated at the same time.

* * * * *